US010813011B2

(12) United States Patent
Li et al.

(10) Patent No.: US 10,813,011 B2
(45) Date of Patent: Oct. 20, 2020

(54) SERVICE REQUEST PROCESSING METHOD AND ASSOCIATED DEVICE

(71) Applicant: VIVO MOBILE COMMUNICATION CO., LTD., Chang'an Dongguan (CN)

(72) Inventors: Xiaolong Li, Chang'an Dongguan (CN); Chenlu Zhang, Chang'an Dongguan (CN); Fei Qin, Chang'an Dongguan (CN)

(73) Assignee: VIVO MOBILE COMMUNICATION CO., LTD., Chang'an, Dongguan (CN)

( * ) Notice: Subject to any disclaimer, the term of this patent is extended or adjusted under 35 U.S.C. 154(b) by 0 days.

(21) Appl. No.: 16/464,775

(22) PCT Filed: Dec. 8, 2017

(86) PCT No.: PCT/CN2017/115144
§ 371 (c)(1),
(2) Date: May 29, 2019

(87) PCT Pub. No.: WO2018/121218
PCT Pub. Date: Jul. 5, 2018

(65) Prior Publication Data
US 2019/0349818 A1    Nov. 14, 2019

(30) Foreign Application Priority Data
Dec. 29, 2016  (CN) .......................... 2016 1 1243969

(51) Int. Cl.
*H04W 36/00*  (2009.01)
*H04W 40/36*  (2009.01)
*H04W 52/02*  (2009.01)

(52) U.S. Cl.
CPC ....... *H04W 36/0033* (2013.01); *H04W 40/36* (2013.01); *H04W 52/0229* (2013.01)

(58) Field of Classification Search
CPC . H04W 36/0033; H04W 76/27; H04W 40/36; H04W 52/0229; H04W 8/08;
(Continued)

(56) References Cited

U.S. PATENT DOCUMENTS

2013/0260740 A1    10/2013  Rayavarapu
2016/0073285 A1    3/2016   Graham et al.
(Continued)

FOREIGN PATENT DOCUMENTS

CN    102711079 A    10/2012
CN    102934406 A    2/2013
(Continued)

OTHER PUBLICATIONS

1st Chinese Office Action for Chinese Application No. 201611243969.7, dated May 5, 2019 (May 5, 2019)—12 pages (English translation—13 pages).
Extended European Search Report for European Application No. 17887422.8, dated Oct. 15, 2019 (Oct. 15, 2019)—14 pages.
International Search Report and Written Opinion for International Application No. PCT/CN2017/115144, dated Jul. 11, 2019 (Jul. 11, 2019)—9 pages (English translation—6 pages).
(Continued)

*Primary Examiner* — Dai Phuong
(74) *Attorney, Agent, or Firm* — Culhane Meadows PLLC; Stephen J. Weed

(57) ABSTRACT

The present disclosure provides a service request processing method and an associated device. The service request processing method includes: receiving a service request from a User Equipment (UE) in an inactive state; when the serving network side device fails to retrieve context information about the UE, retrieving the context information about the UE from a core network device; and transmitting a response message for the service request to the UE. The context information about the UE is retrieved from the core network device, so it is able to respond to the service request from the UE in the inactive state, thereby to prevent a service for the UE from being adversely affected.

7 Claims, 14 Drawing Sheets

(58) Field of Classification Search
CPC ........ Y02D 70/10; Y02D 70/00; Y02D 70/12; Y02D 70/126
See application file for complete search history.

(56) References Cited

U.S. PATENT DOCUMENTS

| | | | | |
|---|---|---|---|---|
| 2017/0245318 | A1* | 8/2017 | Rayavarapu | H04W 76/28 |
| 2017/0311372 | A1* | 10/2017 | Huang | H04W 76/19 |
| 2019/0082490 | A1 | 3/2019 | Zhang et al. | |

FOREIGN PATENT DOCUMENTS

| | | |
|---|---|---|
| CN | 105898894 A | 8/2016 |
| WO | 2015035591 A1 | 3/2015 |

OTHER PUBLICATIONS

LG Electronics Inc.: "UE controlled mobility in RRC_INACTIVE", R2-168420—3GPP TSG-RAN WG2 #96, Aug. 18, 2016, Reno, US (3 pages).

LG Electronics Inc.: "Use of RRC Connection Re-establishment procedure for a lightweight connected UE", R2-167036—3GPP TSG-RAN WG2 Meeting #95bis, Oct. 10, 2016, Kaohsiung, Taiwan (4 pages).

Qualcomm Incorporated: "RRC_INACTIVE System architecture aspects", S2-171802—SA WG2 Meeting #S2-120, Mar. 27, 2017, Busan, South Korea (23 pages).

Samsung: "Remaining issues of RRC connection control from INACTIVE", R2-1711664—3GPP TSG-RAN WG2 #99bis, Oct. 9, 2017, Prague, Czech Republic (7 pages).

* cited by examiner

SERVICE REQUEST PROCESSING METHOD AND ASSOCIATED DEVICE

CROSS-REFERENCE TO RELATED APPLICATION

The present application is the U.S. national phase of PCT Application No. PCT/CN2017/115144 filed on Dec. 8, 2017, which claims the priority of the Chinese patent application 201611243969.7 filed on Dec. 29, 2016, which are incorporated herein by reference in their entirety.

TECHNICAL FIELD

The present disclosure relates to the field of communication technology, in particular to a service request processing method and an associated device.

BACKGROUND

In a communication system, an inactive state (Radio Resource Control (RRC) INACTIVE) has been defined for a User Equipment. The power consumption for the UE in the inactive state may be reduced while meeting the requirements on a future communication service (e.g., a $5^{th}$-Generation (5G) or $6^{th}$-Generation (6G) communication service). However, when the UE in the inactive state has been switched to a new serving cell through cell reselection due to movement and has initiated a service request in the new serving cell, a network side device, in which the UE resides in the new serving cell, needs to retrieve context information about the UE because the context information is probably not stored in the network side device. However, in an actual use, the network side device may probably fail to retrieve the context information about the UE, and thereby a service for the UE may be adversely affected. Hence, in the current communication system, the service for the UE in the inactive state may be adversely affected when the network side device serving the UE cannot retrieve the context information about the UE.

SUMMARY (1) Technical Problem to be Solved

An object of the present disclosure is to provide a service request processing method and an associated device, so as to prevent a service for a UE in an inactive state from being adversely effected when a network side device serving the UE cannot retrieve context information about the UE.

(2) Technical Solution

In one aspect, the present disclosure provides in some embodiments a service request processing method applied to a serving network side device for a UE, including: receiving a service request from the UE in an inactive state; when the serving network side device fails to retrieve context information about the UE, retrieving the context information about the UE from a core network device; and transmitting a response message for the service request to the UE.

In another aspect, the present disclosure provides in some embodiments a service request processing method applied to a UE, including: transmitting a service request to a serving network side device when the UE is in an inactive state; and receiving a response message for the service request from the serving network side device. When the serving network side device fails to retrieve context information about the UE, the serving network side device is configured to retrieve a request message for the context information about the UE from a core network device.

In yet another aspect, the present disclosure provides in some embodiments a service request processing method applied to a core network device, including: receiving a first request message from a serving network side device for a UE in an inactive state; and when context information about the UE has been retrieved successfully, transmitting a first response message to the serving network side device. The first request message is transmitted by the serving network side device when the serving network side device, upon the reception of a service request from the UE, fails to retrieve the context information about the UE. The first request message is adopted to retrieve the context information about the UE, and the first response message includes the context information about the UE.

In still yet another aspect, the present disclosure provides in some embodiments a serving network side device, including: a service request reception module configured to receive a service request from the UE in an inactive state; a first context information acquisition module configured to, when the serving network side device fails to retrieve context information about the UE, retrieve the context information about the UE from a core network device; and a first response message transmission module configured to transmit a response message for the service request to the UE.

In still yet another aspect, the present disclosure provides in some embodiments a UE, including: a service request transmission module configured to transmit a service request to a serving network side device when the UE is in an inactive state; and a first response message reception module configured to receive a response message for the service request from the serving network side device. When the serving network side device fails to retrieve context information about the UE, the serving network side device is configured to transmit a request message for the context information about the UE from a core network device.

In still yet another aspect, the present disclosure provides in some embodiments a core network device, including: a request message reception module configured to receive a first request message from a serving network side device for a UE in an inactive state; and a second response message transmission module configured to, when context information about the UE has been retrieved successfully, transmitting a first response message to the serving network side device. The first request message is transmitted by the serving network side device when the serving network side device, upon the reception of a service request from the UE, fails to retrieve the context information about the UE. The first request message is adopted to retrieve the context information about the UE, and the first response message includes the context information about the UE.

In still yet another aspect, the present disclosure provides in some embodiments a serving network side device, including a processor, a memory, and a computer program stored in the memory and executed by the processor. The computer program is executed by the processor so as to implement the above-mentioned service request processing method.

In still yet another aspect, the present disclosure provides in some embodiments a UE, including a processor, a memory, and a computer program stored in the memory and executed by the processor. The computer program is executed by the processor so as to implement the above-mentioned service request processing method.

In still yet another aspect, the present disclosure provides in some embodiments a core network device, including a processor, a memory, and a computer program stored in the memory and executed by the processor. The computer program is executed by the processor so as to implement the above-mentioned service request processing method.

In still yet another aspect, the present disclosure provides in some embodiments a computer-readable storage medium storing therein a computer program. The computer program is executed by a processor so as to implement the above-mentioned service request processing method performed by the serving network side device.

In still yet another aspect, the present disclosure provides in some embodiments a computer-readable storage medium storing therein a computer program. The computer program is executed by a processor so as to implement the above-mentioned service request processing method performed by the UE.

In still yet another aspect, the present disclosure provides in some embodiments a computer-readable storage medium storing therein a computer program. The computer program is executed by a processor so as to implement the above-mentioned service request processing method performed by the core network device.

(3) Beneficial Effect

The present disclosure has the following beneficial effects. According to the embodiments of the present disclosure, the serving network side device may receive the service request from the UE in the inactive state. When the serving network side device fails to retrieve the context information about the UE, the serving network side device may retrieve the context information about the UE from the core network device. Then, the serving network side device may transmit the response message for the serving request to the UE. The context information about the UE is retrieved from the core network device, so it is able to respond to the service request from the UE in the inactive state, thereby to prevent the service for the UE from being adversely affected.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
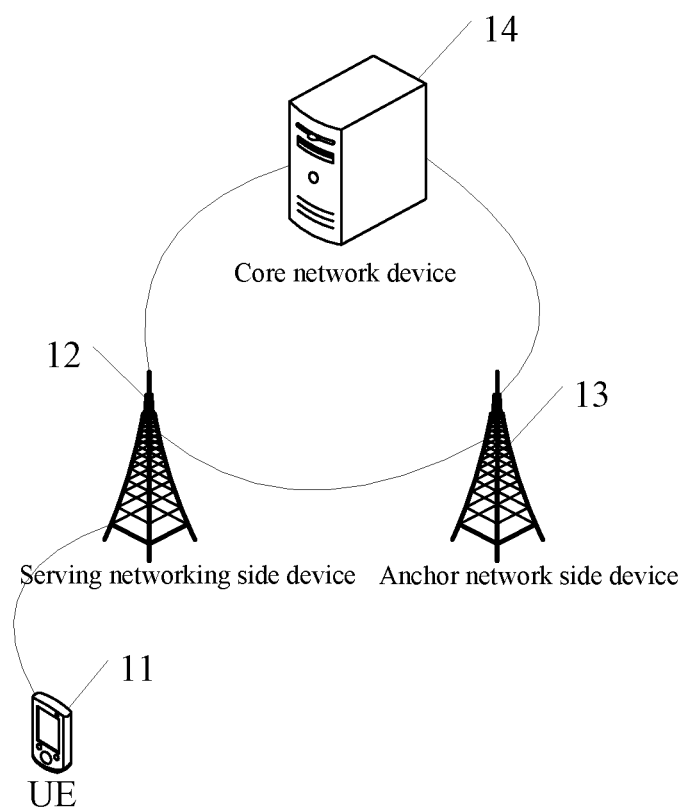
FIG. 1 is a schematic view showing an applicable service request processing system according to some embodiments of the present disclosure.

FIG. 1 shows an applicable service request processing system. As shown in FIG. 1, the service request processing system includes a UE 11, a serving network side device 12, an anchor network side device 13 and a core network device 14. The UE 11 may be a terminal side device such as a mobile phone, a tablet personal computer, a laptop computer, a personal digital assistant (PDA), a mobile Internet device (MID) or a wearable device. The serving network side device 12 may be a network side device currently serving the UE 11, or a network side device where the UE 11 currently resides. The anchor network side device 13 may be a network side device where context information about the UE 11 is stored and where a connection of a network side of the UE to a control plane and a user plane of a core network is maintained. In the embodiments of the present disclosure, it is able to update the serving network side device 12 as an anchor network side device for the UE 11, i.e., update the anchor network side device for the UE 11 from the anchor network side device to the serving network side device 12. In addition, in the embodiments of the present disclosure, the network side device may be a base station (e.g., a macro base station such as a Long Term Evolution (LTE) evolved Node B (eNB), or a $5^{th}$-Generation (5G) New Radio (NR) NB), or a transmission reception point (TRP), or an access point (AP). The core network device 14 may be a device at a core network layer, which will not be particularly defined herein.

It should be appreciated that, the types of the UE, the network side device and the core network device will not be particularly defined in the embodiments of the present disclosure.

First Embodiment

Figure 2:
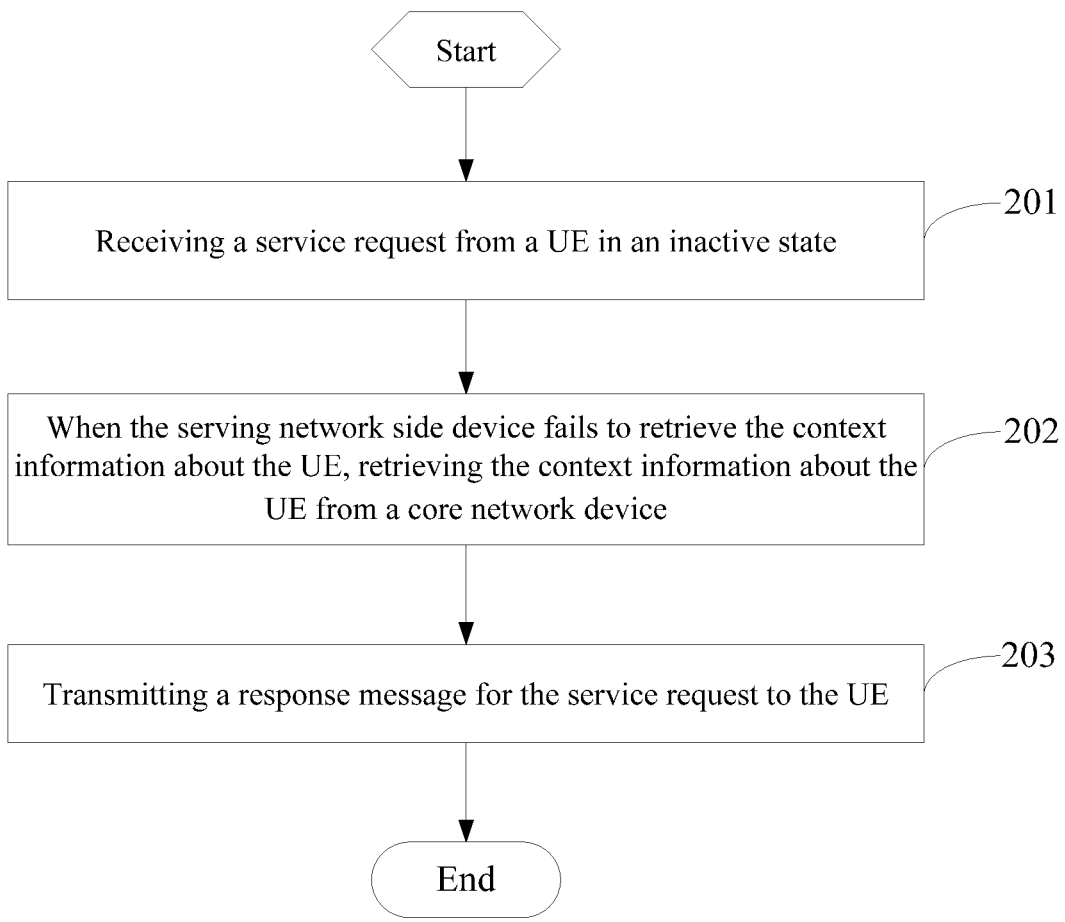
FIG. 2 is a flow chart of a service request processing method according to a first embodiment of the present disclosure.

The present disclosure provides in this embodiment a service request processing method applied to a serving network side device of a UE. As shown in FIG. 2, the service request processing method includes the following steps.

Step 201: receiving a service request from the UE in an inactive state.

In this embodiment, the UE in the inactive state may have at least one of the following characteristics. Mobility of the UE in the inactive state is achieved through cell reselection. A connection of a radio access network (RAN) side of the UE to a control plane and a user plane of a core network (CN-NR RAN) (i.e., a similar connection of S1 to the user plane and the control plane in an LTE system) is maintained in an anchor network side device for the UE. Context information about the UE is stored in at least one network side device, i.e., the context information about the UE is stored in at least the network side device in which the connection of the RAN side of the UE to the control plane and the user plane of the core network (CN-NR RAN) is maintained. A notification to be transmitted to the UE is initialized at the radio access network side (NR RAN), so RAN notification areas are managed by the NR RAN, and the NR RAN knows the RAN notification area to which the UE belongs.

In this embodiment, the RAN notification area may be managed by the radio access network side (NR RAN), and it may include one or more cells (the number of the cells may be determined by the network side device). In addition, the notification with respect to the UE in the RAN notification area may be initiated by the radio access network side (NR RAN). It should be appreciated that, the RAN notification area may also be called as notification area or notification management area including one or more cells, which may be determined by the radio access network side (NR RAN).

In addition, in this embodiment, the service request may be any service request capable of being transmitted by the UE in the inactive state to the serving network side device, which will not be particularly defined herein.

Step 202: when the serving network side device fails to retrieve the context information about the UE, retrieving the context information about the UE from a core network device.

In this embodiment of the present disclosure, upon the reception of the service request from the UE, the serving network side device may retrieve the context information about the UE. Here, the serving network side device may retrieve the context information from the serving network side device itself, or from an anchor network side device for the UE, which will not be particularly defined herein. When the serving network side device fails to retrieve the context information about the UE, it means that the context information about the UE is not stored in the serving network side device itself, or the serving network side device fails to retrieve the context information about the UE from the anchor network side device for the UE. For example, a reason for which the serving network side device fails to retrieve the context information about the UE may lie in that there is no direct interface between the serving network side device and the anchor network side device. Of course, there are the other reasons for which the serving network side device fails to retrieve the context information about the UE, which will not be particularly defined herein.

When the serving network side device fails to retrieve the context information about the UE, it may retrieve the context information about the UE from the core network device. It should be appreciated that, in this embodiment, there may exist two results of the retrieval of the context information about the UE, i.e., the serving network side device may retrieve the context information about the UE successfully or unsuccessfully. When the serving network side device has retrieved the context information about the UE successfully, it may respond to the service request. When the serving network side device has retrieved the context information about the UE unsuccessfully, it may establish a RRC connection for the UE, so as to control the UE to transit from the inactive state to an RRC connected state, thereby to respond to the service request from the UE.

It should be appreciated that, in this embodiment of the present disclosure, the context information about the UE may include, but not limited to, access stratum (AS) context information about the UE.

Step 203: transmitting a response message for the service request to the UE.

In this embodiment of the present disclosure, Step 203 may include transmitting, by the serving network side device, the response message to the UE after the serving network side device has retrieved the context information about the UE from the core network device successfully. Alternatively, Step 203 may include, when the serving network side device fails to retrieve the context information about the UE from the core network device, establishing, by the serving network side device, the RRC connection for the UE, so as to control the UE to transit from the inactive state to the RRC connected state, thereby to respond to the service request from the UE, i.e., transmit the response message to the UE.

Through the above-mentioned steps, when the serving network side device fails to retrieve the context information about the UE, it may retrieve the context information about the UE from the core network device. As a result, it is able to response to the service request from the UE in the inactive state, thereby to prevent the service for the UE from being adversely affected.

It should be appreciated that, in this embodiment of the present disclosure, the method may be applied to a current communication system or a future communication system, e.g., a 5G communication system, a 6G communication system or any other communication system that may occur in the future.

According to the embodiments of the present disclosure, the serving network side device may receive the service request from the UE in the inactive state. When the serving network side device fails to retrieve the context information about the UE, the serving network side device may retrieve the context information about the UE from the core network device. Then, the serving network side device may transmit the response message for the serving request to the UE. The context information about the UE is retrieved from the core network device, so it is able to respond to the service request from the UE in the inactive state, thereby to prevent the service for the UE from being adversely affected.

Second Embodiment

Figure 3:
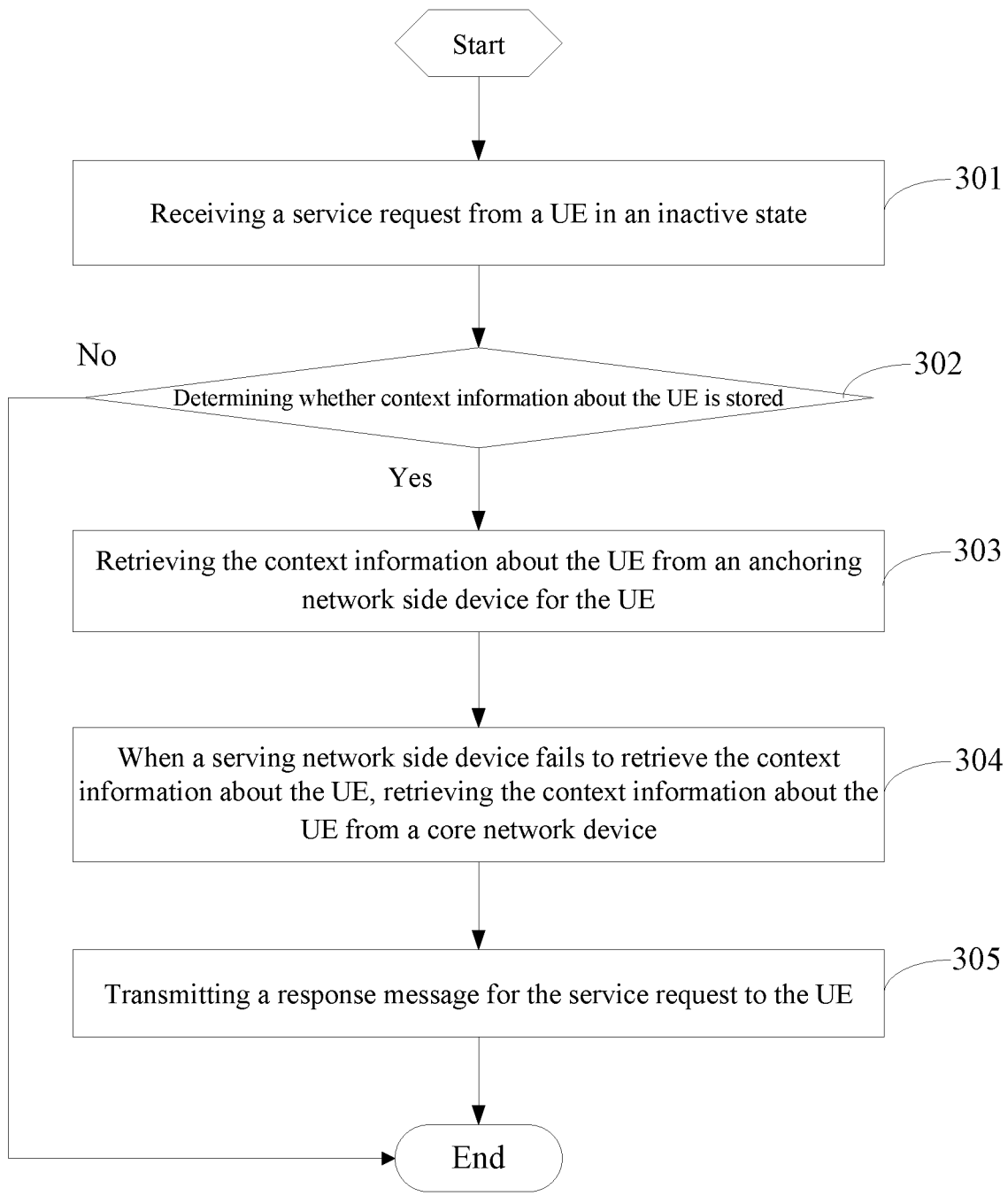
FIG. 3 is a flow chart of a service request processing method according to a second embodiment of the present disclosure.

The present disclosure further provides in this embodiment a service request processing method applied to a serving network side device for a UE. As shown in FIG. 3, the service request processing method includes the following steps.

Step 301: receiving a service request from the UE in an inactive state.

The description about the inactive state and the service request may refer to that mentioned in the first embodiment, and thus will not be particularly defined herein.

In this embodiment of the present disclosure, the service request may include an RRC Connection Resume Request initiated by the UE for the establishment of an RRC connection, or a request initiated by the UE for the transmission of uplink data, or a RAN notification area update request, which will not be particularly defined herein.

Step 302: determining whether context information about the UE is stored, if yes, proceeding to Step 303, and if not, proceeding to Step 305 or ending the entire procedure.

The determining whether the context information about the UE is stored may include determining whether the context information about the UE is locally stored in the serving network side device.

Here, the service request may include an identifier of an anchor network side for the UE. The determining whether the context information about the UE is stored may include: determining whether an identifier of the serving network side device is the same as an identifier of the anchor network side device for the UE; when the identifier of the serving network side device is different from the identifier of the anchor network side device for the UE, determining that the context information about the UE is not stored; and when the identifier of the serving network side device is the same as the identifier of the anchor network side device for the UE, determining that the context information about the UE is stored.

Through the identifier of the ancho network side device for the UE, it is able to determine whether the serving network side device is the anchor network side device for the UE. When the serving network side device is the anchor network side device for the UE, it means that the context information about the UE has been stored, and when the serving network side device is not the anchor network side device for the UE, it means that the context information about the UE is not stored. This is because, in this embodiment of the present disclosure, the context information about the UE is stored in the anchor network side device for the UE, and a connection of a network side of the UE to a control plane and a user plane of a core network is maintained in the anchor network side device for the UE.

Step 303: retrieving the context information about the UE from the anchor network side device for the UE.

This step may include transmitting a request message for the context information about the UE to the anchor network side device for the UE. However, the request message may probably fail to be transmitted, i.e., the retrieval of the context information about the UE from the anchor network side device for the UE may probably fail. For example, the serving network side device may fail to retrieve the context information about the UE from the anchor network side device for the UE through an interface between the serving network side device and the anchor network side device (i.e., an interface similar to LTE X2). A reason for which the serving network side device fails to retrieve the context information about the UE may lie in that there is no direct interface (i.e., an interface similar to LTE X2) between the serving network side device and the anchor network side device.

Through Steps 302 and 303, when the context information about the UE has been stored in the serving network side device, the serving network side device may directly respond to the service request from the UE, and when the context information about the UE is not stored in the serving network side device, the serving network side device may retrieve the context information about the UE from the core network device. In this way, it is able to prevent a service for the UE from being adversely affected, and improve the service processing performance of the UE.

It should be appreciated that, in this embodiment of the present disclosure, Steps 302 and 303 are optional, i.e., Steps 302 and 303 may not be performed. For example, when the serving network side device has received the service request from the UE in the inactive state, it means, by default, that the serving network side device fails to retrieve the context information about the UE.

Step 304: when the serving network side device fails to retrieve the context information about the UE, retrieving the context information about the UE from the core network device.

Step 304 may include, when the serving network side device fails to retrieve the context information about the UE from the anchor network side device for the UE, retrieving the context information about the UE from the core network device.

The description about the unsuccessful acquisition of the context information about the UE by the serving network side device and the acquisition of the context information about the UE from the core network device may refer to that mentioned in the first embodiment with a same or similar beneficial effect, and thus will not be particularly defined herein.

Step 305: transmitting a response message for the service request to the UE.

The description about the response message may refer to that mentioned in the first embodiment with a same or similar beneficial effect, and thus will not be particularly defined herein.

In a possible embodiment of the present disclosure, subsequent to retrieving the context information about the UE from the core network device, the service request processing method may further include, when the context information about the UE has been retrieved from the core network device successfully, switching a path for the UE into a connection from the serving network side device to a user plane and a control plane of a core network. The path for the UE may include a connection from a radio access network side of the UE to the user plane and the control plane of the core network.

The path switch may be performed after message interaction between the serving network side device and the core network device, i.e., the connection from the radio access network side of the UE to the user plane and the control plane of the core network may be maintained by the serving network side device. Through this step, it is able to update the serving network side device as the anchor network side device for the UE. This is because, through this step, it is able to store the context information about the UE in the serving network side device, and maintain the connection from the radio access network side of the UE to the user plane and the control plane of the core network by the serving network side device. In this way, after the serving network side device has been changed into the anchor network side device for the UE, it is able for the serving network side device to process the service request from the UE effectively, thereby to improve the service processing performance of the UE and the network side device.

In a possible embodiment of the present disclosure, the retrieving the context information about the UE from the core network device may include: transmitting a request message for retrieving the context information about the UE to the core network device; and receiving a response message from the core network device. The response message may include the context information about the UE, and at least one of an identifier of the serving network side device, an identifier of the context information about the UE, and an identifier of the anchor network side device for the UE. The context information about the UE may be stored in the anchor network side device for the UE, and the connection from the network side of the UE to the control plane and the user plane of the core network may be maintained by the anchor network side device for the UE.

Through the request message and the response message, the serving network side device may retrieve the context information about the UE from the core network device. Upon the reception of the request message, the core network device may transmit the request message for retrieving the context information about the UE to the anchor network side device for the UE. Upon the reception of the request message, the anchor network side device may search for the context information about the UE, and transmit the response message including the context information about the UE to the core network device. Of course, upon the reception of the request message, there may exist interaction between different control plane network elements of the core network, and then the request message for retrieving the context information about the UE may be transmitted to the anchor network device, which will not be particularly defined herein.

In a possible embodiment of the present disclosure, the transmitting the response message for the service request to the UE may include: when the service request includes a request for establishing an RRC connection and the context information about the UE has been retrieved from the core network device successfully, transmitting the response message for the RRC connection for the UE, establishing the RRC connection for the UE, and implicitly indicating the UE that a network side device to which the RRC connection for the UE has been established is the anchor network side device for the UE; or when the service request includes the request for transmitting the uplink data and the context information about the UE has been retrieved from the core network device successfully, transmitting the response message for the uplink data to the UE, receiving the uplink data from the UE, and indicating the UE that the anchor network side device for the UE has been changed into the serving network side device; or when the service request includes the RAN notification area updating request and the context information about the UE has been retrieved from the core network device successfully, transmitting the response message for updating a RAN notification area to the UE, and indicating the UE that the anchor network side device for the UE has been changed into the serving network side device. The response message for updating the RAN notification area may be adopted to update the RAN notification area.

Through the above-mentioned step, when the service request includes the request for establishing the RRC connection and the context information about the UE has been retrieved from the core network device successfully, the RRC connection may be established, and at this time the UE may be in a connected state so as to complete the service request from the UE. In addition, in this embodiment of the present disclosure, the implicitly indicating the UE that the network side device to which the RRC connection for the UE has been established is the anchor network side device for the UE may be understood as that the network side device to which the RRC connection for the UE has been established is determined by the UE and the network side device as the anchor network side device for the UE by default. As a result, it is unnecessary to notify the UE through an additional message, thereby to reduce the signaling overhead.

In addition, when the service request includes the request for transmitting the uplink data, the uplink data may be transmitted after the context information about the UE has been retrieved from the core network device successfully. Because the uplink data is transmitted when the UE is in the inactive state, it is able to reduce the power consumption for the UE. The indicating the UE that the anchor network side device for the UE has been changed into the serving network side device may include transmitting, by the network side device, indication information indicating that the anchor network side device for the UE has been changed into the serving network side device to the UE. The indication information may be transmitted by the network side device through the response message, or a separate message.

In addition, when the service request includes the RAN notification area update request, the RAN notification area may be updated after the context information about the UE has been retrieved from the core network device successfully. Because the RAN notification area is updated when the UE is in the inactive state, it is able to reduce the power consumption for the UE.

In a possible embodiment of the present disclosure, the request message may further include an identifier of the anchor network side device for the UE and/or an identifier of the context information about the UE, and the request message transmitted by the serving network side device to the core network device may include the identifier of the anchor network side device and/or the identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

Through the identifier of the anchor network side device and/or the identifier of the context information about the UE, it is able for the core network device to rapidly determine the anchor network side device for the UE, and through the identifier of the context information about the UE, it is able for the anchor network side device to rapidly search for the context information about the UE. As a result, it is able to increase the service response efficiency.

In a possible embodiment of the present disclosure, subsequent to retrieving the context information about the UE from the core network device, the service request processing method may further include storing the context information about the UE, and maintaining the connection form the network side device for the UE to the user plane and the control plane of the core network.

Through the above step, the context information about the UE may be stored in the serving network side device, and the connection from the network side device for the UE to the user plane and the control plane of the core network may be maintained by the serving network side device so as to update the serving network side device as the anchor network side device for the UE. As a result, it is able to facilitate the processing the service for the UE. In addition, upon the reception of the service request from the UE again, it is able for the serving network side device to directly respond to the service request, thereby to improve the service response efficiency. Furthermore, an original anchor network side device for the UE may release the context information about the UE, so it is able to save a storage space of the original anchor network side device. It should be appreciated that, the stored context information may be the context information about the UE retrieved from the core network device, or the context information about the UE retrieved by the serving network side device through the connection from the radio access network side of the UE to the user plane and the control plane of the core network.

Figure 4:
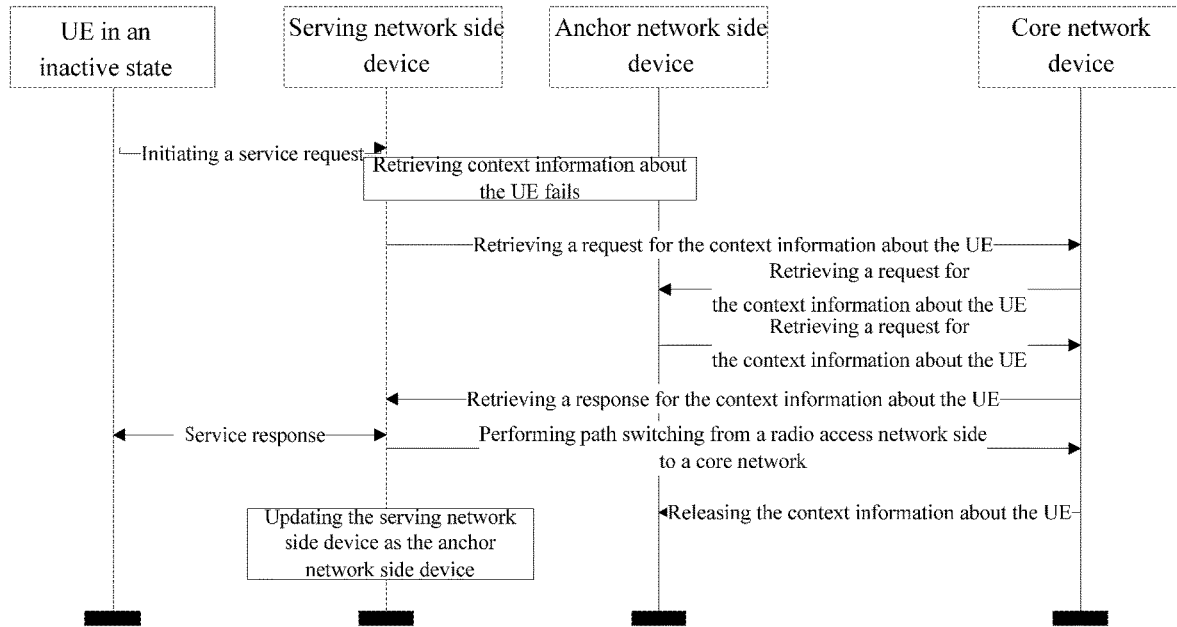
FIG. 4 is another flow chart of the service request processing method according to the second embodiment of the present disclosure.

It should be appreciated that, the above-mentioned possible embodiments may be combined in certain suitable manners. For example, as shown in FIG. 4, when the service request is transmitted by the UE in the inactive state to the serving network side device and the serving network side device fails to retrieve the context information about the UE, the serving network side device may transit the request for retrieving the context information about the UE to the core network device. Upon the reception of the request, the core network device may transmit a request for retrieving the context information about the UE to the anchor network side device. Upon the reception of the request, the anchor network side device may transmit a response message including the context information about the UE to the core network device, and then the core network device may transmit the response message including the context information about the UE to the serving network side device. Upon the acquisition of the context information about the UE, the serving network side device may transmit the response message for the service request to the UE. Of course, during the transmission of the response message for the service request, the UE may also transmit an uplink message to the serving network side device, e.g., establish the RRC connection or transmit the uplink data. In addition, a path switch from the radio access network side to the core network may also be completed by the serving network side device with respect to the core network device, i.e., the connection from the radio access network side of the UE to the user plane and the control plane of the core network may be maintained by the serving network side device. The core network device may notify the anchor network side device to release the context information about the UE. Because the context information about the UE is retrieved by the serving network side device and the connection from the radio access network side of the UE to the user plane and the control plane of the core network is maintained by the serving network side device, it is able to update the serving network side device as the anchor network side device.

In a possible embodiment of the present disclosure, subsequent to retrieving the context information about the UE from the core network device, the service request processing method may further include, when the serving network side device fails to retrieve the context information about the UE from the core network device, establishing the connection from the serving network side device of the UE to the user plane and the control plane of the core network.

Through the above step, when the serving network side device fails to retrieve the context information about the UE from the core network device, the connection from the radio access network side of the UE to the user plane and the control plane of the core network may be established. To be specific, the serving network side device may interact with the core network device through signaling, so as to establish the connection from the radio access network side of the UE to the user plane and the control plane of the core network. It should be appreciated that, because the connection from the radio access network side of the UE to the user plane and the control plane of the core network is established by the serving network side device, the serving network side device may have retrieved or created the context information about the UE during the establishment. As a result, it is able to update the serving network side device as the anchor network side device, thereby to respond to the service request from the UE and improve the service response performance.

In addition, although the connection from the radio access network side of the UE to the user plane and the control plane of the core network has been established by the serving network side device, this connection may probably be maintained by the original anchor network side device for the UE. At this time, the core network device may determine whether the connection is maintained by the original anchor network side device, and if yes, notify the original anchor network side device to release the context information about the UE.

Figure 5:
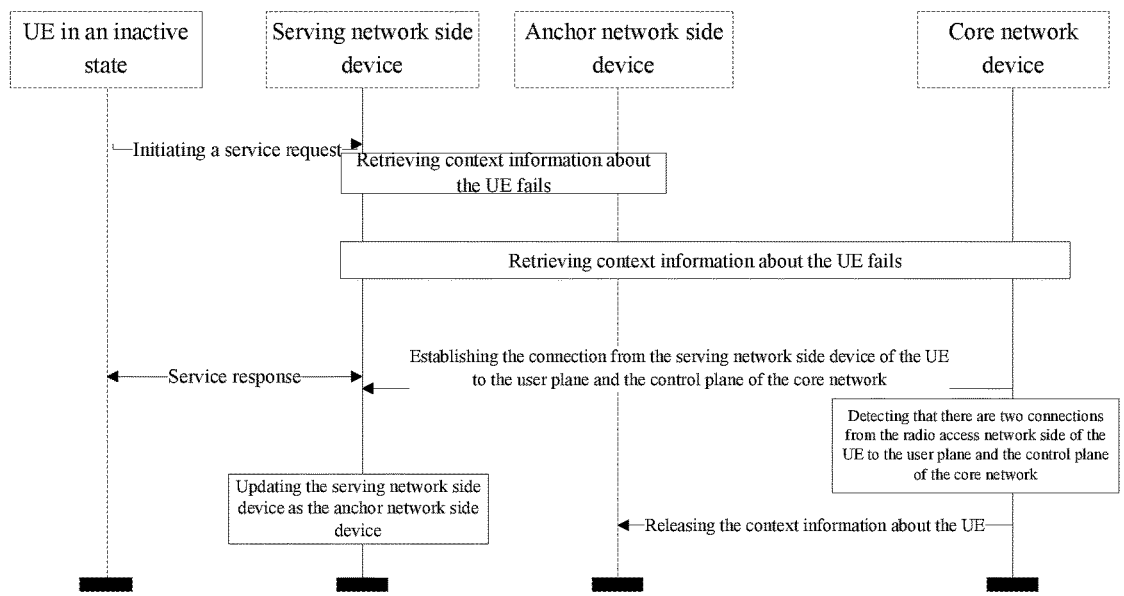
FIG. 5 is yet another flow chart of the service request processing method according to the second embodiment of the present disclosure.

For example, as shown in FIG. 5, the UE in the inactive state may initiate the service request to the serving network side device. When the serving network side device fails to retrieve the context information about the UE and fails to retrieve the context information about the UE from the core network device too, it may transmit a service response to the UE. For example, the UE may transit to be in the RRC connected state, and the UE in the RRC connected state may transmit the uplink data and update the RAN notification area. The connection from the radio access network side of the UE to the user plane and the control plane of the core network may be established by the serving network side device. When the core network device detects that that there are two connections from the radio access network side to the user plane and the control plane of the core network, i.e., the connection from the radio access network side to the user plane and the control plane of the core network is repeated, it may notify the original anchor network side device to release the context information about the UE. Because the connection from the radio access network side to the user plane and the control plane of the core network has been established by the serving network side device, it is able to update the serving network side device as the anchor network side device.

In addition, it should be appreciated that, an order of the step of establishing the connection from the serving network side device to the user plane and the control plane of the core network and Step 305 will not be particularly defined herein. For example, Step 305 may be performed prior to, or subsequent to, the step of establishing the connection from the serving network side device to the user plane and the control plane of the core network, or the two steps may be performed simultaneously.

In a possible embodiment of the present disclosure, the transmitting the response message for the service request to the UE may include: when the service request includes the request for establishing the RRC connection, transmitting the response message for the RRC connection for the UE, and establishing the RRC connection for the UE; or when the service request includes the request for transmitting the uplink data, transmitting indication information indicating that the UE is to transit to the RRC connected state to the UE, establishing the RRC connection for the UE, and receiving the uplink data from the UE in the RRC connected state; or when the service request includes the request for updating the RAN notification area, transmitting indication information indicating that the UE is to transit to the RRC connected state to the UE, establishing the RRC connection for the UE, and updating the RAN notification area when the UE is in the RRC connected state.

In this embodiment of the present disclosure, after the context information about the UE has been retrieved from the core network device unsuccessfully, it is able to switch the UE from the inactive state to the RRC connected state, thereby to respond to the service request from the UE and prevent the service for the UE from being adversely affected.

After the context information about the UE has been retrieved from the core network device unsuccessfully, the RRC connection for the UE may be established, so as to facilitate the serving network side to respond to the service request from the UE, thereby to improve the service processing performance.

Through the above step, when the UE in the inactive state transmits the request for transmitting the uplink data or the request for updating the RAN notification area and the serving network side device fails to retrieve the context information about the UE from the core network device, the serving network side device may notify the UE to transit to the connected state, so as to enable the UE to transmit the uplink data and update the RAN notification area in the connected state, thereby to improve the service processing performance.

In a possible embodiment of the present disclosure, after the establishment of the RRC connection for the UE, the UE may be implicitly indicated that the network side device to which the RRC connection for the UE has been established is the anchor network side device for the UE.

Identically, in this embodiment of the present disclosure, the implicitly indicating the UE that the network side device to which the RRC connection for the UE has been established is the anchor network side device for the UE may be understood as that the network side device to which the RRC connection for the UE has been established is determined by the UE and the network side device as the anchor network side device for the UE by default. As a result, it is unnecessary to notify the UE through an additional message, thereby to reduce the signaling overhead. In addition, it should be appreciated that, in some other possible embodiments of the present disclosure, the UE may also implicitly indicated that the network side device to which the RRC connection for the UE has been established is the anchor network side device for the UE, so as to reduce the signaling interaction between the UE and the network side device, thereby to reduce the signaling overhead.

According to the service request processing method in the second embodiment of the present disclosure, the serving network side device may receive the service request from the UE in the inactive state, determine whether the context information about the UE is stored therein, retrieve the context information about the UE from the anchor network side device for the UE when the context information about the UE is not stored in the serving network side device itself, retrieve the context information about the UE from the core network device when the serving network side device fails to retrieve the context information about the UE, and transmit the response message for the service request to the UE. As a result, when the serving network side device is capable of retrieving the context information about the UE from the anchor network side device, it is able for the serving network side device to directly respond to the service request, thereby to improve the service response efficiency. When the serving network side device fails to retrieve the context information about the UE from the anchor network side device, it is able for the serving network side device to retrieve the context information about the UE from the core network device, thereby to respond to the service request from the UE in the inactive state and prevent the service for the UE from being adversely affected.

Third Embodiment

Figure 6:
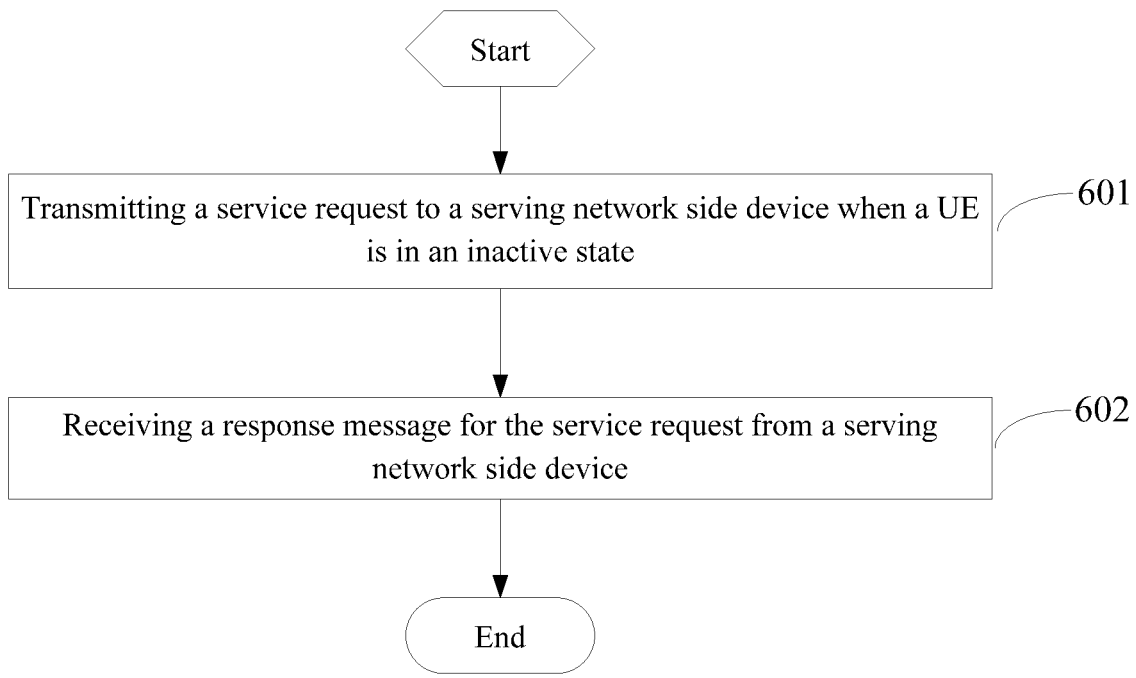
FIG. 6 is a flow chart of a service request processing method according to a third embodiment of the present disclosure.

The present disclosure further provides in this embodiment a service request processing method applied to a UE. As shown in FIG. 6, the service request processing method includes the following steps.

Step 601: transmitting a service request to a serving network side device when the UE is in an inactive state.

The description about the service request may refer to that mentioned in the first and second embodiments with a same or similar beneficial effect, and thus will not be particularly defined herein.

Step 602: receiving a response message for the service request from the serving network side device.

When the serving network side device fails to retrieve context information about the UE, the serving network side device is configured to retrieve a request message for the context information about the UE from a core network device.

The description about the response message may refer to that mentioned in the first and second embodiments with a same or similar beneficial effect, and thus will not be particularly defined herein.

In a possible embodiment of the present disclosure, the receiving the response message for the request message from the serving network side device may include: when the service request includes a request for establishing an RRC connection, receiving the response message for the RRC connection from the serving network side device, establishing the RRC connection for the UE, and implicitly indicating the UE that a network side device to which the RRC connection for the UE has been established is an anchor network side device for the UE; or when the service request includes a request for transmitting uplink data, receiving the response message for transmitting the uplink data from the serving network side device, and transmitting the uplink data to the serving network side device, the serving network side device indicating the UE that the anchor network side device for the UE has been changed into the serving network side device; or when the service request includes a request for updating a RAN notification area, receiving the response message for updating the RAN notification area from the serving network side device, the response message for updating the RAN notification area being adopted to update the RAN notification area, the serving network side device indicating the UE that the anchor network side device for the UE has been changed into the serving network side device. The context information about the UE may be stored in the anchor network side device for the UE, and a connection from a network side of the UE to a control plane and a user plane of a core network may be maintained by the anchor network side device for the UE.

The description about the response message may refer to that in the first and second embodiments with a same or similar beneficial effect, and thus will not be particularly defined herein.

In a possible embodiment of the present disclosure, the service request may further include an identifier of the anchor network side device for the UE and/or an identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

The description about the service request may refer to that mentioned in the first and second embodiments with a same or similar beneficial effect, and thus will not be particularly defined herein.

In a possible embodiment of the present disclosure, the receiving the response message for the service request from the serving network side device may include: when the service request includes the request for establishing the RRC connection, receiving the response message for the RRC connection from the serving network side device, and establishing the RRC connection for the UE; or when the service request includes the request for transmitting the uplink data, receiving indication information indicating that the UE is to transit into an RRC connected state from the serving network side device, establishing the RRC connection for the UE, and transmitting the uplink data to the serving network side device in the RRC connected state; or when the service request includes the request for updating the RAN notification area, receiving indication information indicating that the UE is to transit to the RRC connected state from the serving network side device, establishing the RRC connection for the UE, and updating the RAN notification area in the RRC connected state.

The description about the response message and the establishment of the RRC connection may refer to that mentioned in the first and second embodiments with a same or similar beneficial effect, and thus will not be particularly defined herein.

In a possible embodiment of the present disclosure, after the establishment of the RRC connection for the UE, the UE may be implicitly indicated that the network side device to which the RRC connection for the UE has been established is the anchor network side device for the UE.

The description about the implicit indication may refer to that mentioned in the first and second embodiments with a same or similar beneficial effect, and thus will not be particularly defined herein.

In a possible embodiment of the present disclosure, subsequent to transmitting the service request to the serving network side device when the UE is in the inactive state, the service request processing method may further include storing an identifier of the serving network side device, and determining the serving network side device as the anchor network side device for the UE.

The description about the implicit indication may refer to that mentioned in the first and second embodiments with a same or similar beneficial effect, and thus will not be particularly defined herein.

According to the service request processing method in the third embodiment of the present disclosure, when the UE is in the inactive state, the UE may transmit the service request to the serving network side device, and receive the response message for the service request from the serving network side device. When the serving network side device fails to retrieve the context information about the UE, the serving network side device may retrieve the context information about the UE from the core network device. Because the context information about the UE is retrieved from the core network device, it is able to respond to the service request from the UE in the inactive state, thereby to prevent the service for the UE from being adversely affected.

Fourth Embodiment

Figure 7:
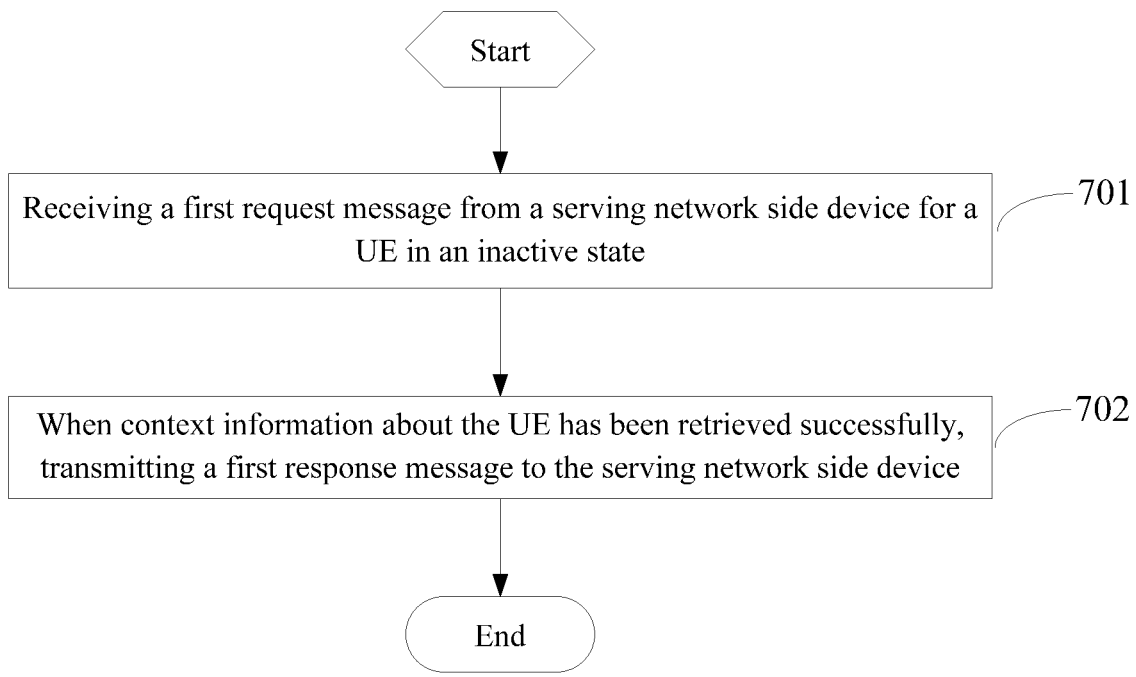
FIG. 7 is a flow chart of a service request processing method according to a fourth embodiment of the present disclosure.

The present disclosure further provides in this embodiment a service request processing method applied to a core network device. As shown in FIG. 7, the service request processing method includes the following steps.

Step 701: receiving a first request message from a serving network side device for a UE in an inactive state.

Here, the description about the first request message may refer to that mentioned in the second embodiment with a same or similar beneficial effect, and thus will not be particularly defined herein.

Step 702: when context information about the UE has been retrieved successfully, transmitting a first response message to the serving network side device.

The first request message may be transmitted by the serving network side device when the serving network side device, upon the reception of a service request from the UE, fails to retrieve the context information about the UE. The first request message may be adopted to retrieve the context information about the UE, and the first response message may include the context information about the UE.

Here, the description about the first response message may refer to that mentioned in the second embodiment with a same or similar beneficial effect, and thus will not be particularly defined herein.

In a possible embodiment of the present disclosure, subsequent to receiving the request for retrieving the context information from the serving network side device for the UE in the inactive state and prior to transmitting the response message to the serving network side device, the service request processing method may further include: transmitting a second request message to the anchor network side device for the UE; and receiving a second response message from the anchor network side device. The second request message may be adopted to retrieve the context information about the UE, and the second response message may include the context information about the UE and an identifier of the context information about the UE. The context information about the UE may be stored in the anchor network side device for the UE, and a connection from a network side of the UE to a control plane and a user plane of a core network may be maintained by the anchor network side device for the UE.

Here, the description about the acquisition of the context information about the UE from the anchor network side device may refer to that mentioned in the second embodiment with a same or similar beneficial effect, and thus will not be particularly defined herein.

In a possible embodiment of the present disclosure, the first response message may further include at least one of an identifier of the serving network side device, the identifier of the context information about the UE, and an identifier of the anchor network side device for the UE.

Here, the description about the first response message may refer to that mentioned in the second embodiment with a same or similar beneficial effect, and thus will not be particularly defined herein.

In a possible embodiment of the present disclosure, the first request message may include the identifier of the anchor network side device and/or the identifier of the context information about the UE. The second request message may include the identifier of the context information about the UE. The identifier of the anchor network side device may be adopted by the core network device to retrieve the context information about the UE from the anchor network side device. The identifier of the context information about the UE may be adopted by the anchor network side device to search for the context information about the UE, and transmit the context information about the UE to the core network device.

Here, the description about the first request message and the second request message may refer to that mentioned in the second embodiment with a same or similar beneficial effect, and thus will not be particularly defined herein.

In a possible embodiment of the present disclosure, subsequent to transmitting the first response message to the serving network side device, the service request processing method may further include switching a path for the UE into a connection from the serving network side device to the user plane and the control plane of the core network. The path for the UE may include the connection from the radio access network side of the UE to the user plane and the control plane of the core network.

Here, the description about the path switch may refer to that mentioned in the second embodiment with a same or similar beneficial effect, and thus will not be particularly defined herein.

In a possible embodiment of the present disclosure, subsequent to switching the path for the UE into the connection from the serving network side device to the user plane and the control plane of the core network, the service request processing method may further include notifying the anchor network side device for the UE to release the context information about the UE.

Here, the description about the releasing of the context information about the UE may refer to that mentioned in the second embodiment with a same or similar beneficial effect, and thus will not be particularly defined herein.

In a possible embodiment of the present disclosure, subsequent to receiving the first request message from the serving network side device for the UE in the inactive state, the service request processing method may further include, when the context information about the UE has been retrieved unsuccessfully, establishing the connection from the serving network side device of the UE to the user plane and the control plane of the core network for the serving network side device.

Here, the description about the establishment of the connection from the radio access network side of the UE to the user plane and the control plane of the core network may refer to that mentioned in the second embodiment with a same or similar beneficial effect, and thus will not be particularly defined herein.

In a possible embodiment of the present disclosure, subsequent to establishing the connection from the serving network side device of the UE to the user plane and the control plane of the core network for the serving network side device, the service request processing method may further include: determining whether the connection from the radio access network side of the UE to the user plane and the control plane of the core network is repeated; and when the connection from the radio access network side of the UE to the user plane and the control plane of the core network is repeated, notifying an original anchor network side device for the UE to release the context information about the UE.

Here, the description about the releasing of the context information about the UE may refer to that mentioned in the second embodiment with a same or similar beneficial effect, and thus will not be particularly defined herein.

According to the service request processing method in the fourth embodiment of the present disclosure, the core network device may receive the first request message from the serving network side device for the UE in the inactive state, and when the context information about the UE has been retrieved successfully, transmit the first response message to the serving network side device. The first request message may be transmitted by the serving network side device when the serving network side device, upon the reception of the service request from the UE, fails to retrieve the context information about the UE. The first request message may be adopted to retrieve the context information about the UE, and the first response message may include the context information about the UE. Because the context information about the UE is retrieved by the serving network side device from the core network device, it is able to respond to the service request from the UE in the inactive state, thereby to prevent the service for the UE from being adversely affected.

Fifth Embodiment

Figure 8:
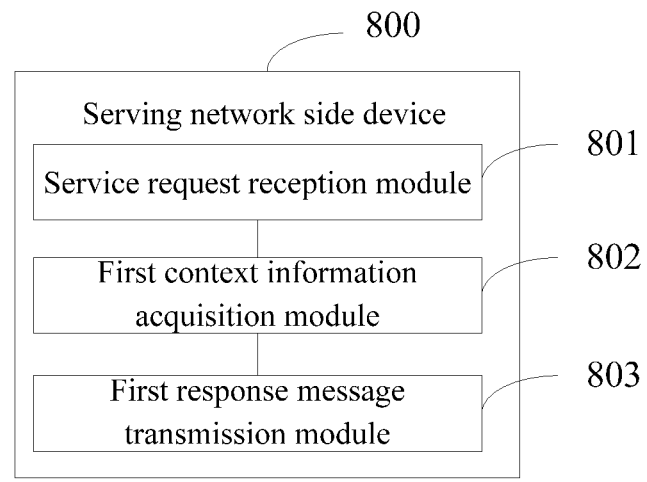
FIG. 8 is a schematic view showing a serving network side device according to a fifth embodiment of the present disclosure.

The present disclosure further provides in this embodiment a serving network side device capable of implementing the service request processing method in the first and second embodiments with a same or similar beneficial effect. As shown in FIG. 8, the serving network side device 800 includes a service request reception module 801, a first context information acquisition module 802 and a first response message transmission module 803. The service request reception module 801 is connected to the first context information acquisition module 802, and the first context information acquisition module 802 is further connected to the first response message transmission module 803. The service request reception module 801 is configured to receive a service request from the UE in an inactive state. The first context information acquisition module 802 is configured to, when the serving network side device fails to retrieve context information about the UE, retrieve the context information about the UE from a core network device. The first response message transmission module 803 is configured to transmit a response message for the service request to the UE.

Figure 9:
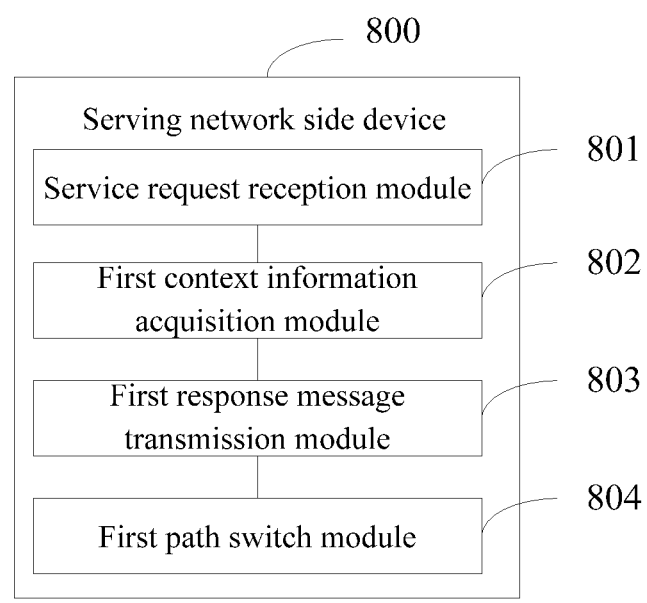
FIG. 9 is another schematic view showing the serving network side device according to the fifth embodiment of the present disclosure.

In a possible embodiment of the present disclosure, as shown in FIG. 9, the serving network side device 800 may further include a first path switch module 804 configured to, when the context information about the UE has been retrieved from the core network device successfully, switch a path for the UE into a connection from the serving network side device to a user plane and a control plane of a core network. The path for the UE may include a connection from a radio access network side of the UE to the user plane and the control plane of the core network.

Figure 10:
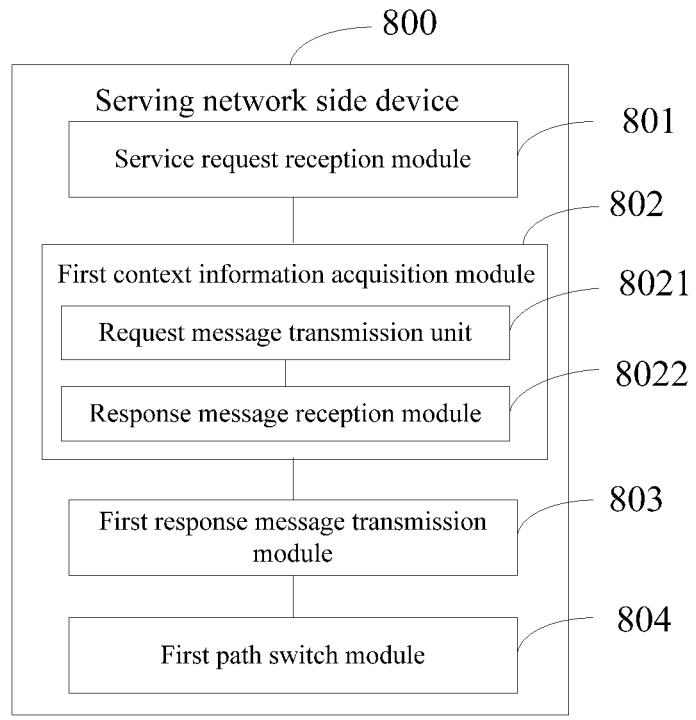
FIG. 10 is yet another schematic view showing the serving network side device according to the fifth embodiment of the present disclosure.

In a possible embodiment of the present disclosure, as shown in FIG. 10, the first context information acquisition module 802 may include: a request message transmission module 8021 configured to transmit a request message for retrieving the context information about the UE to the core network device; and a response message reception module 8022 configured to receive a response message from the core network device. The response message may include the context information about the UE, and at least one of an identifier of the serving network side device, an identifier of the context information about the UE and an identifier of an anchor network side device for the UE. The context information about the UE may be stored in the anchor network side device for the UE, and the connection from the network side of the UE to the control plane and the user plane of the core network may be maintained by the anchor network side device for the UE.

In a possible embodiment of the present disclosure, the first response message transmission module 803 is further configured to: when the service request includes a request for establishing an RRC connection and the context information about the UE has been retrieved from the core network device successfully, transmit the response message for the RRC connection to the UE, establish the RRC connection for the UE, and implicitly indicate the UE that a network side device to which the RRC connection for the UE has been established is the anchor network side device for the UE; or when the service request includes a request for transmitting uplink data and the context information about the UE has been retrieved from the core network device successfully, transmit the response message for the uplink data to the UE, receive the uplink data from the UE, and indicate that the anchor network side device for the UE has been changed into the serving network side device; or when the service request includes a request for updating a RAN notification area and the context information about the UE has been retrieved from the core network device successfully, transmit the response message for updating the RAN notification area to the UE, and indicate that the anchor network side device for the UE has been changed into the serving network side device. The response message for updating the RAN notification area may be adopted to update the RAN notification area.

In a possible embodiment of the present disclosure, the service request may further include the identifier of the anchor network side device for the UE and/or the identifier of the context information about the UE. The request message transmitted from the serving network side device to the core network side device may include the identifier of the anchor network side device and/or the identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

Figure 11:
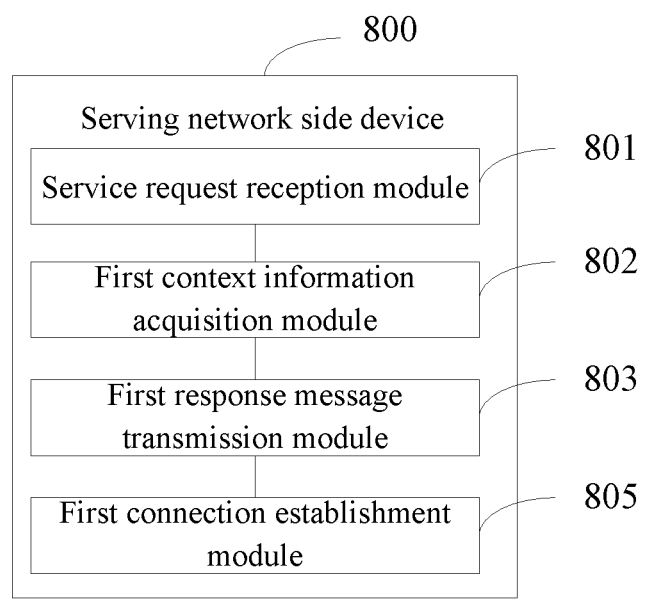
FIG. 11 is still yet another schematic view showing the serving network side device according to the fifth embodiment of the present disclosure.

In a possible embodiment of the present disclosure, as shown in FIG. 11, the serving network side device 800 may further include a first connection establishment module 805 configured to, when the context information about the UE has been retrieved from the core network device unsuccessfully, establish the connection from the radio access network side of the UE to the user plane and the control plane of the core network.

In a possible embodiment of the present disclosure, the first response message transmission module 803 is further configured to: when the service request includes the request for establishing the RRC connection, transmit the response message for the RRC connection to the UE, and establish the RRC connection for the UE; or when the service request includes the request for transmitting the uplink data, transmit indication information indicating that the UE is to transit to the RRC connected state to the UE, establish the RRC connection for the UE, and receive the uplink data from the UE in the RRC connected state; or when the service request includes the request for updating the RAN notification area, transmit indication information indicating that the UE is to transit to the RRC connected state to the UE, establish the RRC connection for the UE, and update the RAN notification area when the UE is in the RRC connected state.

In a possible embodiment of the present disclosure, after the establishment of the RRC connection for the UE, the UE may be implicitly indicated that a network side device to which the RRC connection for the UE has been established is the anchor network side device for the UE.

Figure 12:
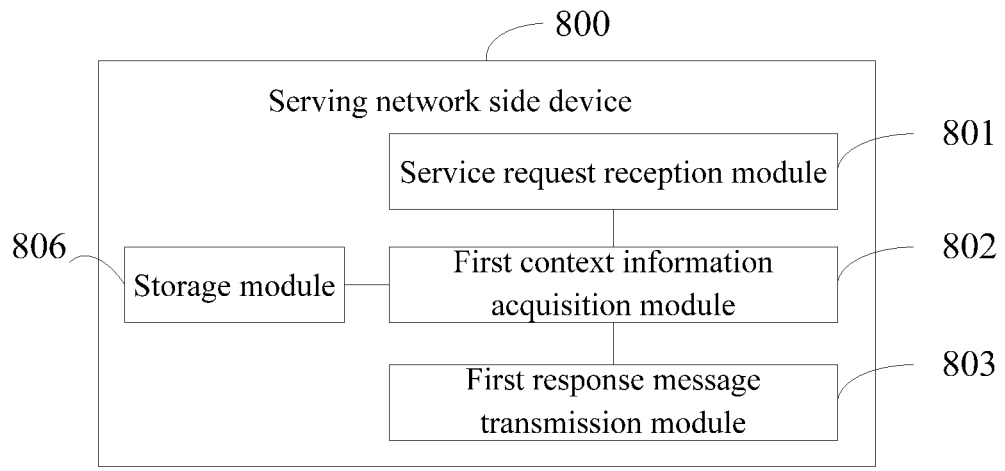
FIG. 12 is still yet another schematic view showing the serving network side device according to the fifth embodiment of the present disclosure.

In a possible embodiment of the present disclosure, as shown in FIG. 12, the serving network side device 800 may further include a storage module 806 configured to store therein the context information about the UE and maintain the connection from the network side of the UE to the user plane and the control plane of the core network.

Figure 13:
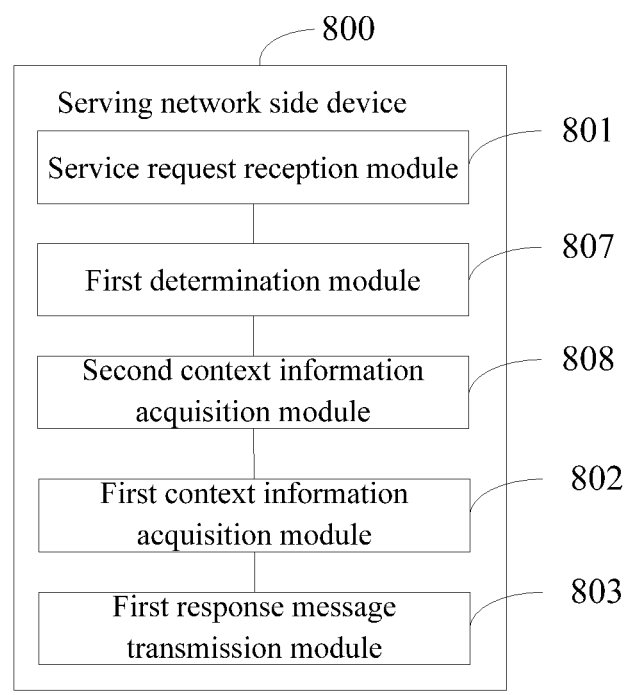
FIG. 13 is still yet another schematic view showing the serving network side device according to the fifth embodiment of the present disclosure.

In a possible embodiment of the present disclosure, as shown in FIG. 13, the serving network side device 800 may further include: a first determination module 807 configured to determine whether the context information about the UE is stored; and a second context information acquisition module 808 configured to, when the context information about the UE is not stored, retrieve the context information about the UE from the anchor network side device for the UE. The first context information acquisition module 802 is further configured to, when the serving network side device fails to retrieve the context information about the UE from the anchor network side device for the UE, retrieve the context information about the UE from the core network device.

Figure 14:
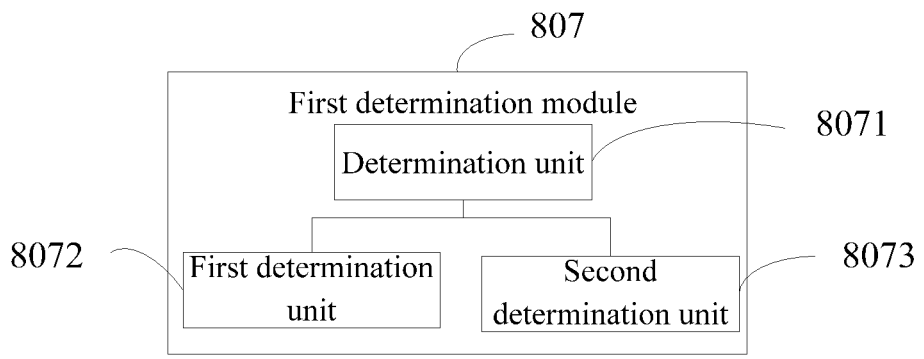
FIG. 14 is a schematic view showing a first determination module of the serving network side device according to the fifth embodiment of the present disclosure.

In a possible embodiment of the present disclosure, the service request may include the identifier of the anchor network side device for the UE. As shown in FIG. 14, the first determination module 807 may include: a determination unit 8071 configured to determine whether the identifier of the serving network side device is the same as the identifier of the anchor network side device for the UE; a first determination unit 8072 configured to, when the identifier of the serving network side device is different from the identifier of the anchor network side device for the UE, determine that the context information about the UE is not stored; and a second determination unit 8073 configured to, when the identifier of the serving network side device is the same as the identifier of the anchor network side device for the UE, determine that the context information about the UE is stored.

According to the serving network side device in the fifth embodiment of the present disclosure, the serving network side device may receive the service request from the UE in the inactive state, retrieve the context information about the UE from the core network device when the serving network side device fails to retrieve the context information about the UE, and transmit the response message for the service request to the UE. Because the context information about the UE is retrieved from the core network device, it is able to respond to the service request from the UE in the inactive state, thereby to prevent the service for the UE from being adversely affected.

Sixth Embodiment

Figure 15:
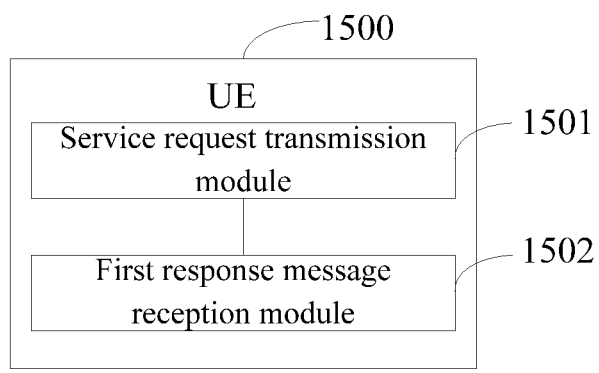
FIG. 15 is a schematic view showing a UE according to a sixth embodiment of the present disclosure.

The present disclosure further provides in this embodiment a UE capable of implementing the service request processing method in the third embodiment with a same or similar beneficial effect. As shown in FIG. 15, the UE 1500 includes a service request transmission module 1501 and a first response message reception module 1502 connected to the service request transmission module 1501. The service request transmission module 1501 is configured to transmit a service request to a serving network side device when the UE is in an inactive state. The first response message reception module 1502 is configured to receive a response message for the service request from the serving network side device. When the serving network side device fails to retrieve context information about the UE, the serving network side device is configured to retrieve a request message for the context information about the UE from a core network device.

In a possible embodiment of the present disclosure, the first response message reception module 1502 is further configured to: when the service request includes a request for establishing an RRC connection, receive the response message for the RRC connection from the serving network side device, establish the RRC connection for the UE, and implicitly indicate the UE that a network side device to which the RRC connection for the UE has been established is an anchor network side device for the UE; or when the service request includes a request for transmitting uplink data, receive the response message for transmitting the uplink data from the serving network side device, and transmit the uplink data to the serving network side device, the serving network side device indicating that the anchor network side device for the UE has been changed into the serving network side device; or when the service request includes a request for updating a RAN notification area, receive the response message for updating the RAN notification area from the serving network side device, the response message for updating the RAN notification area being adopted to update the RAN notification area, and the serving network side device indicating that the anchor network side device for the UE has been changed into the serving network side device. The anchor network side device for the UE is configured to store therein the context information about the UE and maintain a connection from a network side of the UE to a control plane and a user plane of a core network.

In a possible embodiment of the present disclosure, the service request may further include an identifier of the anchor network side device for the UE and/or an identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

In a possible embodiment of the present disclosure, the first response message reception module 1502 is further configured to: when the service request includes the request for establishing the RRC connection, receive the response message for the RRC connection from the serving network side device, and establish the RRC connection for the UE; or when the service request includes the request for transmitting the uplink date, receive indication information indicating that the UE is to transit to an RRC connected state from the serving network side device, establish the RRC connection for the UE, and transmit the uplink data to the serving network side device in the RRC connected state; or when the service request includes the request for updating the RAN notification area, receive indication information indicating that the UE is to transit to the RRC connected state from the serving network side device, establish the RRC connection for the UE, and update the RAN notification area in the RRC connected state.

In a possible embodiment of the present disclosure, after the establishment of the RRC connection for the UE, the UE may be implicitly indicated that a network side device to which the RRC connection for the UE has been established is the anchor network side device for the UE.

Figure 16:
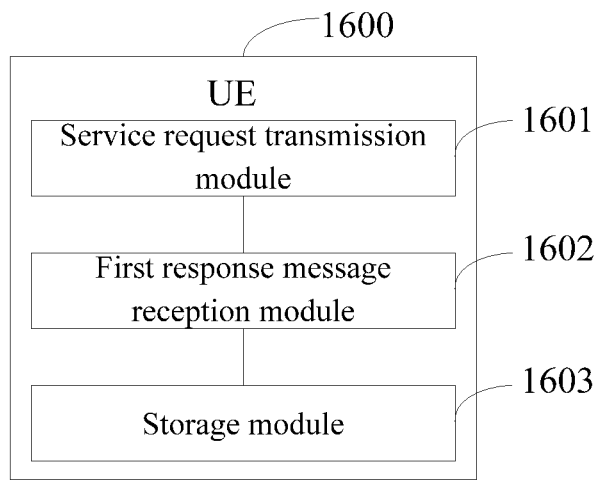
FIG. 16 is another schematic view showing the UE according to the sixth embodiment of the present disclosure.

In a possible embodiment of the present disclosure, as shown in FIG. 16, the UE 1600 may further include a storage module 1603 configured to store therein an identifier of the serving network side device and determine the serving network side device as the anchor network side device for the UE.

According to the UE in the sixth embodiment of the present disclosure, the UE may transmit the service request to the serving network side device when the UE is in the inactive state, and receive the response message for the service request from the serving network side device. When the serving network side device fails to retrieve the context information about the UE, it may retrieve the context information about the UE from the core network device. Because the context information about the UE is retrieved from the core network device, it is able to respond to the service request from the UE in the inactive state, thereby to prevent the service for the UE from being adversely affected.

Seventh Embodiment

Figure 17:
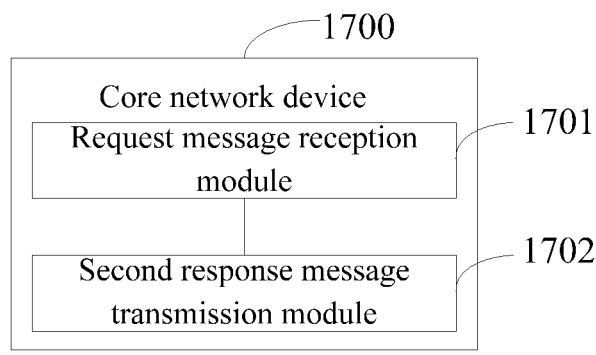
FIG. 17 is a schematic view showing a core network device according to a seventh embodiment of the present disclosure.

The present disclosure further provides in this embodiment a core network device capable of implementing the service request processing method in the fourth embodiment with a same or similar beneficial effect. As shown in FIG. 17, the core network device 1700 includes a request message reception module 1701 and a second response message transmission module 1702 connected to the request message reception module 1701. The request message reception module 1701 is configured to receive a first request message from a serving network side device for a UE in an inactive state. The second response message transmission module 1702 is configured to, when context information about the UE has been retrieved successfully, transmit a first response message to the serving network side device. The first request message may be transmitted by the serving network side device when the serving network side device, upon the reception of a service request from the UE, fails to retrieve the context information about the UE. The first request message may be adopted to retrieve the context information about the UE, and the first response message may include the context information about the UE.

Figure 18:
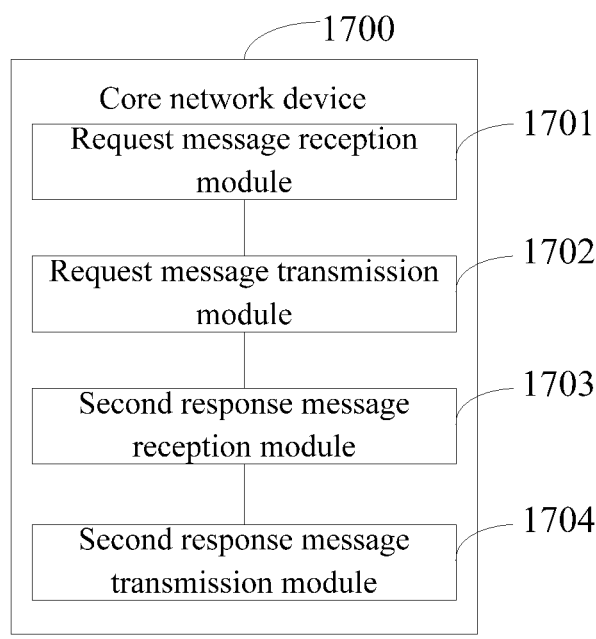
FIG. 18 is another schematic view showing the core network device according to the seventh embodiment of the present disclosure.

In a possible embodiment of the present disclosure, as shown in FIG. 18, the core network device 1700 may further include: a request message transmission module 1703 configured to transmit a second request message to an anchor network side device for the UE; and a second response message reception module 1704 configured to receive a second response message from the anchor network side device. The second request message may be adopted to retrieve the context information about the UE. The anchor network side device for the UE is configured to store therein the context information about the UE, and maintain a connection from a network side of the UE to a control plane and a user plane of a core network.

In a possible embodiment of the present disclosure, the first response message may include at least one of an identifier of the serving network side device, an identifier of the context information about the UE and an identifier of the anchor network side device for the UE.

In a possible embodiment of the present disclosure, the first request message may include the identifier of the anchor network side device and/or the identifier of the context information about the UE. The second request message may include the identifier of the context information about the UE. The identifier of the anchor network side device may be adopted by the core network device to retrieve the context information about the UE from the anchor network side device, and the identifier of the context information about the UE may be adopted by the anchor network side device to search for the context information about the UE and transmit the context information about the UE to the core network device.

Figure 19:
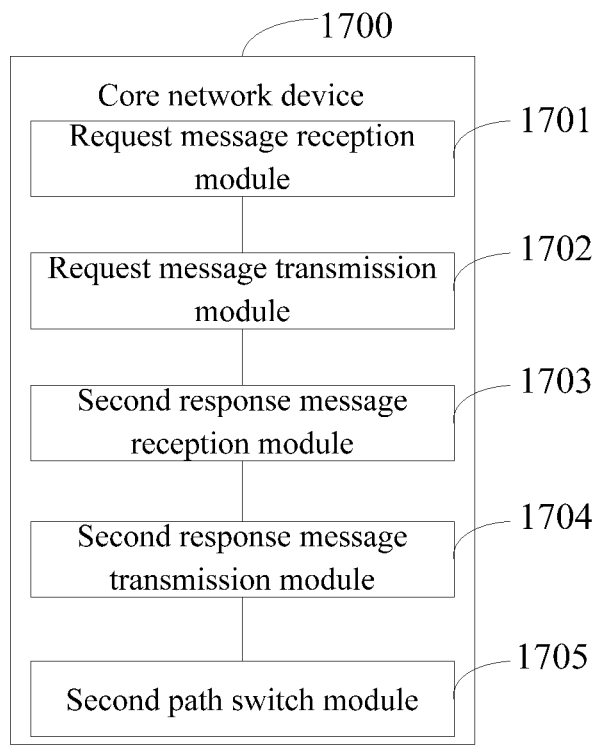
FIG. 19 is yet another schematic view showing the core network device according to the seventh embodiment of the present disclosure.

In a possible embodiment of the present disclosure, as shown in FIG. 19, the core network device 1700 may further include a second path switch module 1705 configured to switch a path for the UE into a connection from the serving network side device to the user plane and the control plane of the core network. The path for the UE may include the connection from the radio access network side of the UE to the user plane and the control plane of the core network.

Figure 20:
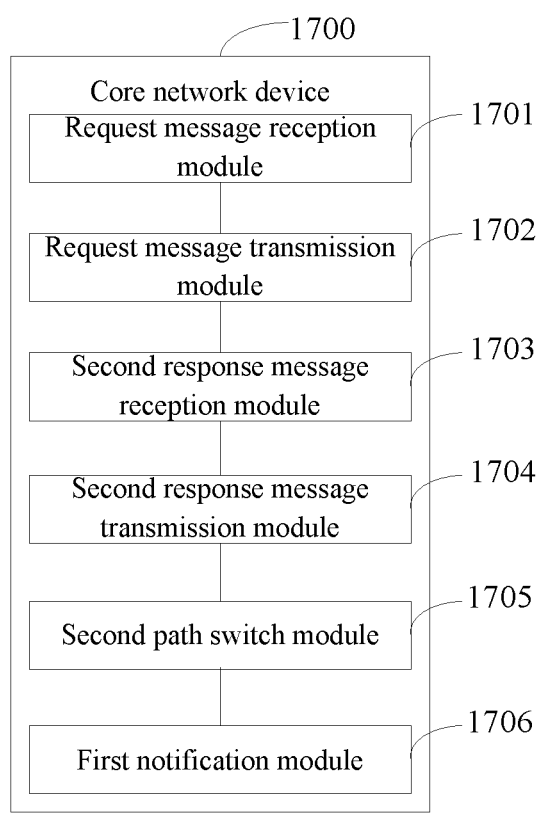
FIG. 20 is still yet another schematic view showing the core network device according to the seventh embodiment of the present disclosure.

In a possible embodiment of the present disclosure, as shown in FIG. 20, the core network device 1700 may further include a first notification module 1706 configured to notify the anchor network side device for the UE to release the context information about the UE.

Figure 21:
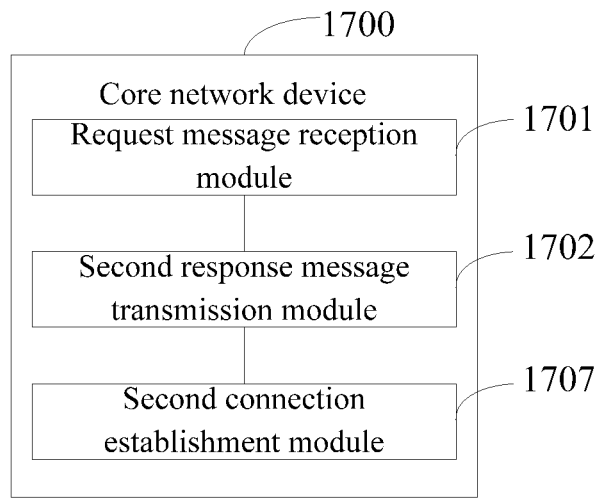
FIG. 21 is still yet another schematic view showing the core network device according to the seventh embodiment of the present disclosure.

In a possible embodiment of the present disclosure, as shown in FIG. 21, the core network device 1700 may further include a second connection establishment module 1707 configured to, when the context information about the UE has been retrieved unsuccessfully, establish the connection from the radio access network side of the UE to the user plane and the control plane of the core network for the serving network side device.

Figure 22:
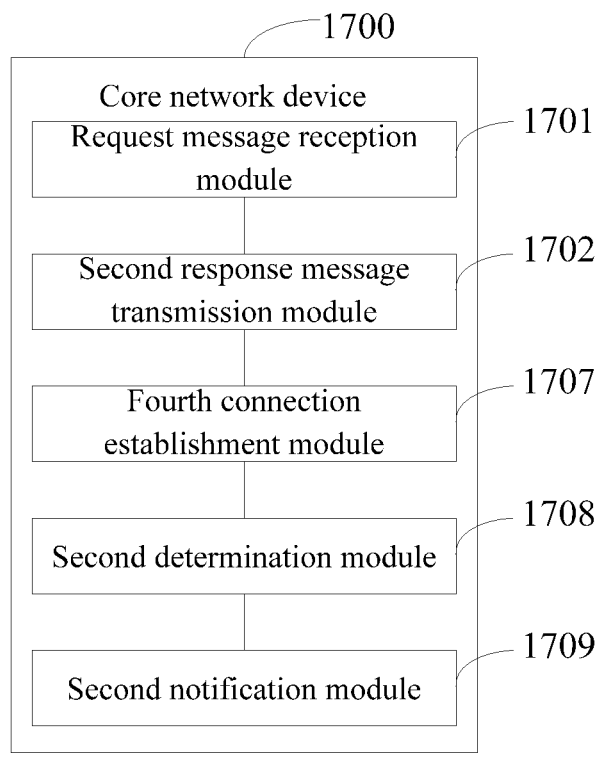
FIG. 22 is still yet another schematic view showing the core network device according to the seventh embodiment of the present disclosure.

In a possible embodiment of the present disclosure, as shown in FIG. 22, the core network device 1700 may further include: a second determination module 1708 configured to determine whether the connection from the radio access network side of the UE to the user plane and the control plane of the core network is repeated; and a second notification module 1709 configured to, when the connection from the radio access network side of the UE to the user plane and the control plane of the core network is repeated, notify an original anchor network side device for the UE to release the context information about the UE.

According to the core network device in the seventh embodiment of the present disclosure, the core network device may receive the first request message from the serving network device for the UE in the inactive state, and when the context information about the UE has been retrieved successfully, transmit the first response message to the serving network side device. The first request message may be transmitted by the serving network side device when the serving network side device, upon the reception of the service request from the UE, fails to retrieve the context information about the UE. The first request message may be adopted to retrieve the context information about the UE, and the first response message may include the context information about the UE. Because the context information about the UE is retrieved by the serving network side device from the core network device, it is able to respond to the service request from the UE in the inactive state, thereby to prevent the service for the UE from being adversely affected.

Eighth Embodiment

Figure 23:
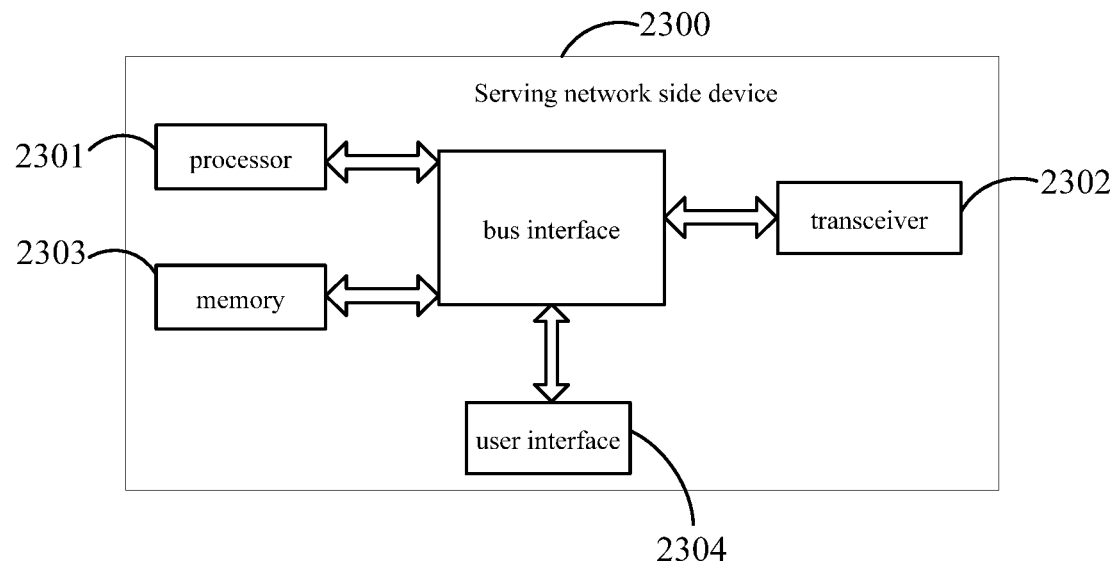
FIG. 23 is a schematic view showing a serving network side device according to an eighth embodiment of the present disclosure.

The present disclosure further provides in this embodiment a serving network side device capable of implementing the serving request processing method in the first and second embodiments with a same or similar beneficial effect. As shown in FIG. 23, the serving network side device 2300 includes a processor 2301, a transceiver 2302, a memory 2303, a user interface 2304 and a bus interface. The processor 2301 is configured to read a program stored in the memory 2303, so as to: receive through the transceiver 2302 a service request from a UE in an inactive state; when the serving network side device fails to retrieve context information about the UE, retrieve the context information about the UE from a core network device; and transmit a response message for the service request to the UE. The transceiver 2302 is configured to receive and transmit data under the control of the processor 2301.

In FIG. 23, bus architecture may include a number of buses and bridges connected to each other, so as to connect various circuits for one or more processors 2301 and one or more memories 2303. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 2302 may consist of a plurality of elements, i.e., a transmitter and a receiver for communication with any other devices over a transmission medium.

With respect to different UEs, the user interface 2304 may also be provided for devices which are to be arranged inside or outside the UE, and these devices may include but not limited to a keypad, a display, a speaker, a microphone and a joystick.

The processor 2301 may take charge of managing the bus architecture as well as general processing. The memory 2303 may store therein data for the operation of the processor 2301.

In a possible embodiment of the present disclosure, the processor 2301 is further configured to, when the context information about the UE has been retrieved from the core network device successfully, switch a path for the UE into a connection from the serving network side device to a user plane and a control plane of a core network. The path for the UE may include a connection from a radio access network side of the UE to the user plane and the control plane of the core network.

In a possible embodiment of the present disclosure, the processor 2301 is further configured to: transmit a request message for retrieving the context information about the UE to the core network device; and receive a response message from the core network device. The response message may include the context information about the UE, and at least one of an identifier of the serving network side device, an identifier of the context information about the UE and an identifier of an anchor network side device for the UE. The anchor network side device for the UE is configured to store therein the context information about the UE, and maintain the connection from the network side of the UE to the control plane and the user plane of the core network.

In a possible embodiment of the present disclosure, the processor 2301 is further configured to: when the service request includes a request for establishing an RRC connection and the context information about the UE has been retrieved from the core network device successfully, transmit the response message for the RRC connection to the UE, establish the RRC connection for the UE, and implicitly indicate the UE that a network side device to which the RRC connection for the UE has been established is the anchor network side device for the UE; or when the service request includes a request for transmitting uplink data and the context information about the UE has been retrieved from the core network device successfully, transmit the response message for the uplink data to the UE, receive the uplink data from the UE, and indicate that the anchor network side device for the UE has been changed into the serving network side device; or when the service request includes a request for updating a RAN notification area and the context information about the UE has been retrieved from the core network device successfully, transmit the response message for updating the RAN notification area to the UE, and indicate that the anchor network side device for the UE has been changed into the serving network side device. The response message for updating the RAN notification area may be adopted to update the RAN notification area.

In a possible embodiment of the present disclosure, the service request may further include the identifier of the anchor network side device for the UE and/or the identifier of the context information about the UE. The request message transmitted from the serving network side device to the core network side device may include the identifier of the anchor network side device and/or the identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

In a possible embodiment of the present disclosure, the processor 2301 is further configured to, when the context information about the UE has been retrieved from the core network device unsuccessfully, establish the connection from the radio access network side of the UE to the user plane and the control plane of the core network.

In a possible embodiment of the present disclosure, the processor 2301 is further configured to: when the service request includes the request for establishing the RRC connection, transmit the response message for the RRC connection to the UE, and establish the RRC connection for the UE; or when the service request includes the request for transmitting the uplink data, transmit indication information indicating that the UE is to transit to the RRC connected state to the UE, establish the RRC connection for the UE, and receive the uplink data from the UE in the RRC connected state; or when the service request includes the request for updating the RAN notification area, transmit indication information indicating that the UE is to transit to the RRC connected state to the UE, establish the RRC connection for the UE, and update the RAN notification area when the UE is in the RRC connected state.

In a possible embodiment of the present disclosure, the processor is further configured to implicitly indicate the UE that a network side device to which the RRC connection for the UE has been established is the anchor network side device for the UE.

In a possible embodiment of the present disclosure, after the establishment of the RRC connection for the UE, the processor 2301 is further configured to store the context information about the UE and maintain the connection from the network side of the UE to the user plane and the control plane of the core network.

In a possible embodiment of the present disclosure, the processor 2301 is further configured to: determine whether the context information about the UE is stored; when the context information about the UE is not stored, retrieve the context information about the UE from the anchor network side device for the UE; and when the serving network side device fails to retrieve the context information about the UE from the anchor network side device for the UE, retrieve the context information about the UE from the core network device.

In a possible embodiment of the present disclosure, the service request may include the identifier of the anchor network side device for the UE. The processor 2301 is further configured to: determine whether the identifier of the serving network side device is the same as the identifier of the anchor network side device for the UE; when the identifier of the serving network side device is different from the identifier of the anchor network side device for the UE, determine that the context information about the UE is not stored; and when the identifier of the serving network side device is the same as the identifier of the anchor network side device for the UE, determine that the context information about the UE is stored.

According to the serving network side device in the fifth embodiment of the present disclosure, the serving network side device may receive the service request from the UE in the inactive state, retrieve the context information about the UE from the core network device when the serving network side device fails to retrieve the context information about the UE, and transmit the response message for the service request to the UE. Because the context information about the UE is retrieved from the core network device, it is able to respond to the service request from the UE in the inactive state, thereby to prevent the service for the UE from being adversely affected.

Ninth Embodiment

Figure 24:
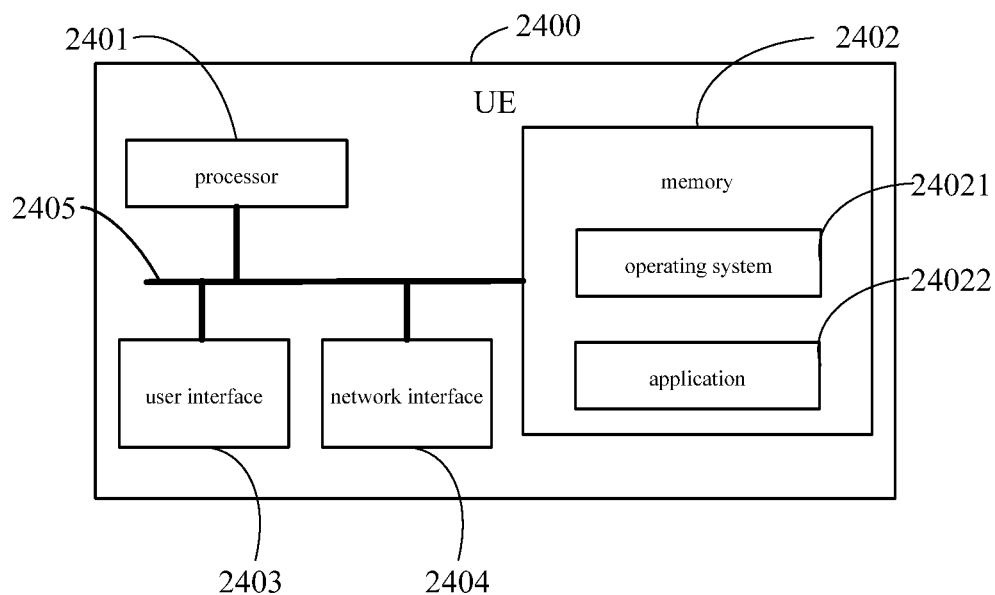
FIG. 24 is a schematic view showing a UE according to a ninth embodiment of the present disclosure.

The present disclosure further provides in this embodiment a UE capable of implementing the service request processing method in the third embodiment with a same or similar beneficial effect. As shown in FIG. 24, the UE 2400 includes at least one processor 2401, a memory 2402, at least one network interface 2404, and a user interface 2403. The components of the UE 2400 may be coupled together through a bus system 2405. It should be appreciated that, the bus system 2405 is configured to achieve connection and communication among the components. Apart from a data bus, the bus system 2405 may further include a power source bus, a control bus and a state signal bus. For clarification, all these buses in FIG. 24 may be collectedly called as bus system 2405.

The user interface 2403 may include a display, a keyboard or a pointing device (e.g., mouse, track ball, touch plate or touch panel).

It should be appreciated that, the memory 2402 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 2402 intends to include, but not limited to, the above-mentioned and any other appropriate memories.

In a possible embodiment of the present disclosure, the following elements may be stored in the memory 2402: an executable module or data structure, a subset or an extended set thereof, an operating system 24021 and an application 24022.

The operating system 24021 may include various system programs, e.g., a framework layer, a core layer and a driving layer, so as to implement various basic services and process hardware-based tasks. The application 24022 may include various applications, e.g., Media Player and Browser, so as to implement various application services. The programs for implementing the above-mentioned method may be included in the application 24022.

In this embodiment, through calling a program or instruction stored in the memory 2402, e.g., a program or instruction stored in the application 24022, the processor 2401 is configured to: transmit a service request to a serving network side device when the UE is in an inactive state; and receive a response message for the service request from the serving network side device. When the serving network side device fails to retrieve context information about the UE, the serving network side device is configured to retrieve a request message for the context information about the UE from a core network device.

The above-mentioned method may be applied to, or implemented by, the processor 2401. The processor 2401 may be an integrated circuit (IC) having a signal processing capability. During the implementation, the steps of the above-mentioned method may be completed through an integrated logic circuit of hardware in the processor 2401 or instructions in the form of software. The processor 2401 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 2402, and the processor 2401 may read information stored in the memory 2402 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the processor 2401 is further configured to: when the service request includes a request for establishing an RRC connection, receive the response message for the RRC connection from the serving network side device, establish the RRC connection for the UE, and implicitly indicate the UE that a network side device to which the RRC connection for the UE has been established is an anchor network side device for the UE; or when the service request includes a request for transmitting uplink data, receive the response message for transmitting the uplink data from the serving network side device, and transmit the uplink data to the serving network side device, the serving network side device indicating that the anchor network side device for the UE has been changed into the serving network side device; or when the service request includes a request for updating a RAN notification area, receive the response message for updating the RAN notification area from the serving network side device, the response message for updating the RAN notification area being adopted to update the RAN notification area, and the serving network side device indicating that the anchor network side device for the UE has been changed into the serving network side device. The anchor network side device for the UE is configured to store therein the context information about the UE and maintain a connection from a network side of the UE to a control plane and a user plane of a core network.

In a possible embodiment of the present disclosure, the service request may further include an identifier of the anchor network side device for the UE and/or an identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

In a possible embodiment of the present disclosure, the processor 2401 is further configured to: when the service request includes the request for establishing the RRC connection, receive the response message for the RRC connection from the serving network side device, and establish the RRC connection for the UE; or when the service request includes the request for transmitting the uplink data, receive indication information indicating that the UE is to transit to an RRC connected state from the serving network side device, establish the RRC connection for the UE, and transmit the uplink data to the serving network side device in the RRC connected state; or when the service request includes the request for updating the RAN notification area, receive indication information indicating that the UE is to transit to the RRC connected state from the serving network side device, establish the RRC connection for the UE, and update the RAN notification area in the RRC connected state.

In a possible embodiment of the present disclosure, after the establishment of the RRC connection for the UE, the UE may be implicitly indicated that a network side device to which the RRC connection for the UE has been established is the anchor network side device for the UE.

In a possible embodiment of the present disclosure, the processor 2401 is further configured to store therein an identifier of the serving network side device and determine the serving network side device as the anchor network side device for the UE.

According to the UE in the sixth embodiment of the present disclosure, the UE may transmit the service request to the serving network side device when the UE is in the inactive state, and receive the response message for the service request from the serving network side device. When the serving network side device fails to retrieve the context information about the UE, it may retrieve the context information about the UE from the core network device. Because the context information about the UE is retrieved from the core network device, it is able to respond to the service request from the UE in the inactive state, thereby to prevent the service for the UE from being adversely affected.

Tenth Embodiment

Figure 25:
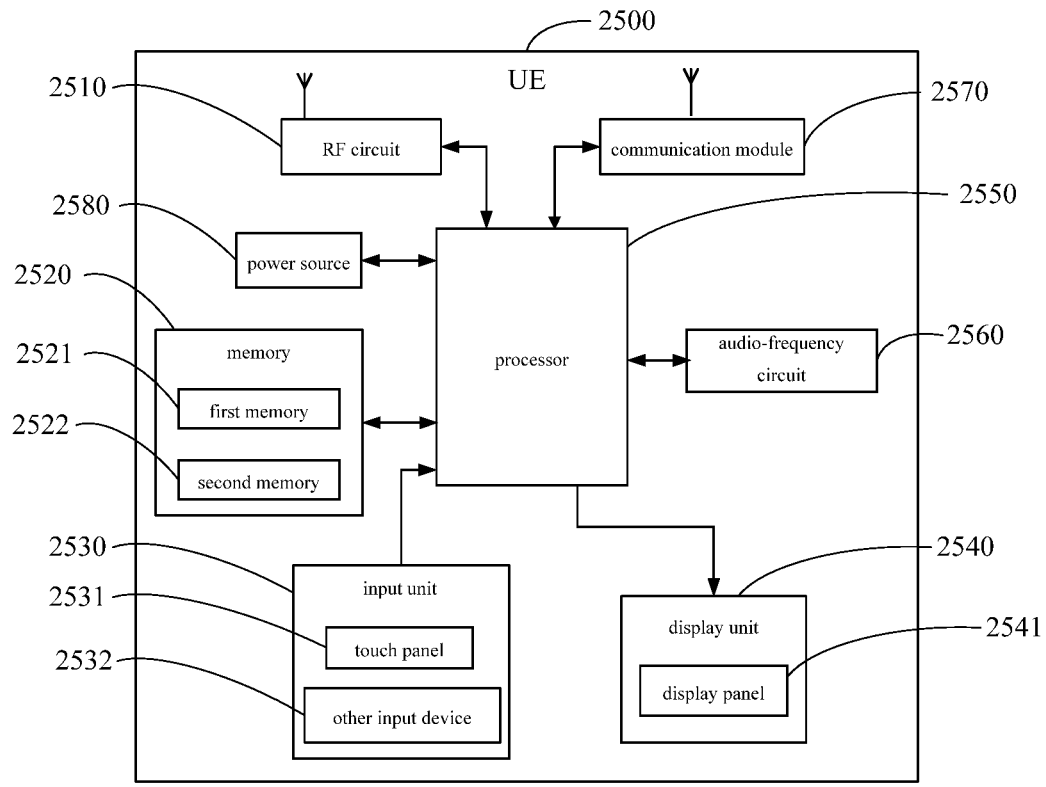
FIG. 25 is a schematic view showing a UE according to a tenth embodiment of the present disclosure.

The present disclosure further provides in this embodiment a UE capable of implementing the service request processing method in the first and second embodiments with a same or similar beneficial effect. As shown in FIG. 25, the UE 2500 includes a Radio Frequency (RF) circuit 2510, a memory 2520, an input unit 2530, a display unit 2540, a processor 2550, an audio-frequency circuit 2560, a communication module 2570 and a power source 2580.

The input unit 2530 is configured to receive digital or character information inputted by a user, and generate a signal input related to user settings and function control of the UE 2500. To be specific, the input unit 2530 may include a touch panel 2531. The touch panel 2531, also called as touch screen, is configured to collect a touch operation made by the user on or in proximity to the touch panel (e.g., an operation made by the user through any appropriate object or attachment (e.g., finger or stylus) on or in the proximity to the touch panel 2531), and drive a corresponding connection device in accordance with a predetermined program. In a possible embodiment of the present disclosure, the touch panel 2531 may include a touch detection unit and a touch controller. The touch detection unit is configured to detect a touch position and signals generated due to the touch operation, and transmit the signal to the touch controller. The touch controller is configured to receive touch information from the touch detection unit, switch it into coordinates of a touch point, transmit the coordinates to the processor 2550, and receive and execute a command from the processor 2550. In addition, the touch panel 2531 may be of a resistive type, a capacitive type, an infrared type or a surface acoustic wave (SAW) type. Apart from the touch panel 2531, the input unit 2530 may further include an input device 2532. The input device 2532 may include, but not limited to, a physical keyboard, a functional button (e.g., a volume control button or an on/off button), a trackball, a mouse, and a joystick.

The display unit 2540 is configured to display information inputted by the user or information to be presented to the user, and various interfaces for the UE, and it may include a display panel 2541. In a possible embodiment of the present disclosure, the display panel 2541 may be a Liquid Crystal Display (LCD) panel or an Organic Light-Emitting Diode (OLED) panel.

It should be appreciated that, the touch panel 2531 may cover the display panel 2541, so as to form a touch display panel. When the touch operation made on or in proximity to the touch display panel has been detected, the touch information may be transmitted to the processor 2550 so as to determine a type of a touch event. Then, the processor 2550 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 2550 may be a control center of the UE 2500, and connected to each member of the entire UE via various interfaces and lines. The processor 2550 is configured to run or execute software programs and/or modules stored in a first memory 2521, and call data stored in a second memory 2522, so as to achieve various functions of the UE 2500 and process the data, thereby to monitor the UE 2500. In a possible embodiment of the present disclosure, the processor 2550 may include one or more processing units.

In this embodiment of the present disclosure, through calling the software program and/or module stored in the first memory 2521 and/or the data stored in the second memory 2522, the processor 2550 is configured to: transmit a service request to a serving network side device when the UE is in an inactive state; and receive a response message for the service request from the serving network side device. When the serving network side device fails to retrieve context information about the UE, the serving network side device is configured to retrieve a request message for the context information about the UE from a core network device.

In a possible embodiment of the present disclosure, the processor 2550 is further configured to: when the service request includes a request for establishing an RRC connection, receive the response message for the RRC connection from the serving network side device, establish the RRC connection for the UE, and implicitly indicate the UE that a network side device to which the RRC connection for the UE has been established is an anchor network side device for the UE; or when the service request includes a request for transmitting uplink data, receive the response message for transmitting the uplink data from the serving network side device, and transmit the uplink data to the serving network side device, the serving network side device indicating that the anchor network side device for the UE has been changed into the serving network side device; or when the service request includes a request for updating a RAN notification area, receive the response message for updating the RAN notification area from the serving network side device, the response message for updating the RAN notification area being adopted to update the RAN notification area, and the serving network side device indicating that the anchor network side device for the UE has been changed into the serving network side device. The anchor network side device for the UE is configured to store therein the context information about the UE and maintain a connection from a network side of the UE to a control plane and a user plane of a core network.

In a possible embodiment of the present disclosure, the service request may further include an identifier of the anchor network side device for the UE and/or an identifier of the context information about the UE. The identifier of the anchor network side device may be adopted by the core network device to retrieve the context information about the UE from the anchor network side device, the identifier of the context information about the UE may be adopted by the core network device to transmit an identifier of the UE to the anchor network side device, and the identifier of the UE may be adopted by the anchor network side device to search for the context information about the UE and transmit the context information about the UE to the core network device.

In a possible embodiment of the present disclosure, the processor 2550 is further configured to: when the service request includes the request for establishing the RRC connection, receive the response message for the RRC connection from the serving network side device, and establish the RRC connection for the UE; or when the service request includes the request for transmitting the uplink date, receive indication information indicating that the UE is to transit to an RRC connected state from the serving network side device, establish the RRC connection for the UE, and transmit the uplink data to the serving network side device in the RRC connected state; or when the service request includes the request for updating the RAN notification area, receive indication information indicating that the UE is to transit to the RRC connected state from the serving network side device, establish the RRC connection for the UE, and update the RAN notification area in the RRC connected state.

In a possible embodiment of the present disclosure, after the establishment of the RRC connection for the UE, the UE may be implicitly indicated that a network side device to which the RRC connection for the UE has been established is the anchor network side device for the UE.

In a possible embodiment of the present disclosure, the processor 2550 is further configured to store therein an identifier of the serving network side device and determine the serving network side device as the anchor network side device for the UE.

According to the UE in the sixth embodiment of the present disclosure, the UE may transmit the service request to the serving network side device when the UE is in the inactive state, and receive the response message for the service request from the serving network side device. When the serving network side device fails to retrieve the context information about the UE, it may retrieve the context information about the UE from the core network device. Because the context information about the UE is retrieved from the core network device, it is able to respond to the service request from the UE in the inactive state, thereby to prevent the service for the UE from being adversely affected.

Eleventh Embodiment

Figure 26:
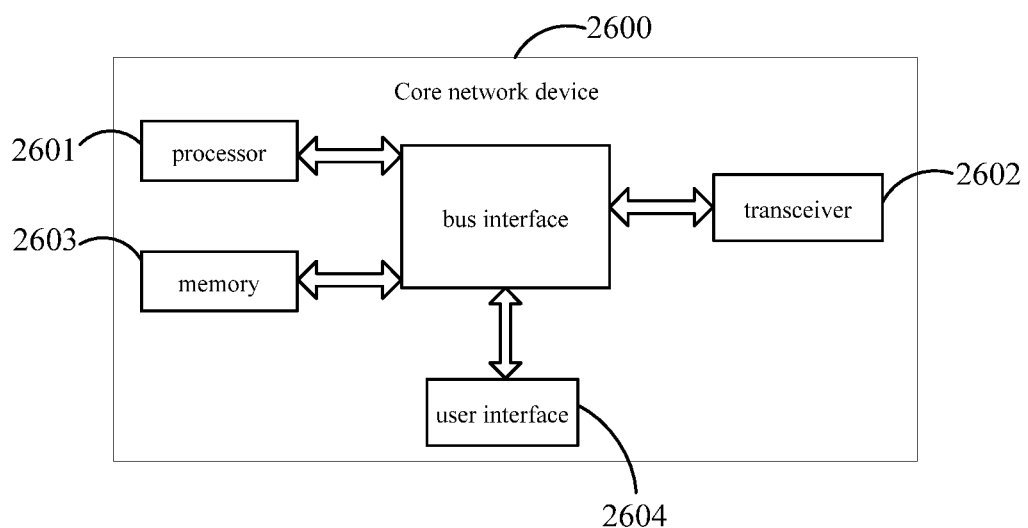
FIG. 26 is a schematic view showing a core network device according to an eleventh embodiment of the present disclosure.

The present disclosure further provides in this embodiment a core network device capable of implementing the service request processing method in the fourth embodiment with a same or similar beneficial effect. As shown in FIG. 26, the core network device 2600 includes a processor 2601, a transceiver 2602, a memory 2603, a user interface 2604 and a bus interface. The processor 2601 is configured to read a program stored in the memory 2603, so as to: receive through the transceiver 2602, a first request message from a serving network side device for a UE in an inactive state; and when context information about the UE has been retrieved successfully, transmit through the transceiver 2602 a first response message to the serving network side device. The first request message may be transmitted by the serving network side device when the serving network side device, upon the reception of a service request from the UE, fails to retrieve the context information about the UE. The first request message may be adopted to retrieve the context information about the UE, and the first response message may include the context information about the UE. The transceiver 2602 is configured to receive and transmit data under the control of the processor 2601.

In FIG. 26, bus architecture may include a number of buses and bridges connected to each other, so as to connect various circuits for one or more processors 2601 and one or more memories 2603. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 2602 may consist of a plurality of elements, i.e., a transmitter and a receiver for communication with any other devices over a transmission medium. With respect to different UEs, the user interface 2604 may also be provided for devices which are to be arranged inside or outside the UE, and these devices may include but not limited to a keypad, a display, a speaker, a microphone and a joystick.

The processor 2601 may take charge of managing the bus architecture as well as general processing. The memory 2603 may store therein data for the operation of the processor 2601.

In a possible embodiment of the present disclosure, the processor 2601 is further configured to: transmit a second request message to an anchor network side device for the UE; and receive a second response message from the anchor network side device. The second request message may be adopted to retrieve the context information about the UE. The anchor network side device for the UE is configured to store therein the context information about the UE, and maintain a connection from a network side of the UE to a control plane and a user plane of a core network.

In a possible embodiment of the present disclosure, the first response message may include at least one of an identifier of the serving network side device, an identifier of the context information about the UE and an identifier of the anchor network side device for the UE.

In a possible embodiment of the present disclosure, the first request message may include the identifier of the anchor network side device and/or the identifier of the context information about the UE. The second request message may include the identifier of the context information about the UE. The identifier of the anchor network side device may be adopted by the core network device to retrieve the context information about the UE from the anchor network side device, and the identifier of the context information about the UE may be adopted by the anchor network side device to search for the context information about the UE and transmit the context information about the UE to the core network device.

In a possible embodiment of the present disclosure, the processor 2601 is further configured to switch a path for the UE into a connection from the serving network side device to the user plane and the control plane of the core network. The path for the UE may include the connection from the radio access network side of the UE to the user plane and the control plane of the core network.

In a possible embodiment of the present disclosure, the processor 2601 is further configured to notify the anchor network side device for the UE to release the context information about the UE.

In a possible embodiment of the present disclosure, the processor 2601 is further configured to, when the context information about the UE has been retrieved unsuccessfully, establish the connection from the radio access network side of the UE to the user plane and the control plane of the core network for the serving network side device.

In a possible embodiment of the present disclosure, the processor 2601 is further configured to: determine whether the connection from the radio access network side of the UE to the user plane and the control plane of the core network is repeated; and when the connection from the radio access network side of the UE to the user plane and the control plane of the core network is repeated, notify an original anchor network side device for the UE to release the context information about the UE.

According to the core network device in the seventh embodiment of the present disclosure, the core network device may receive the first request message from the serving network side device for the UE in the inactive state, and when the context information about the UE has been retrieved successfully, transmit the first response message to the serving network side device. The first request message may be transmitted by the serving network side device when the serving network side device, upon the reception of the service request from the UE, fails to retrieve the context information about the UE. The first request message may be adopted to retrieve the context information about the UE, and the first response message may include the context information about the UE. Because the context information about the UE is retrieved by the serving network side device from the core network device, it is able to respond to the service request from the UE in the inactive state, thereby to prevent the service for the UE from being adversely affected.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A service request processing method applied to a core network device, comprising:
   receiving a first request message from a serving network side device for a UE in an inactive state; and
   when context information about the UE has been retrieved successfully, transmitting a first response message to the serving network side device,
   wherein the first request message is transmitted by the serving network side device when the serving network side device, upon the reception of a service request from the UE, fails to retrieve the context information about the UE from an anchor network side device for the UE,
   wherein the first request message is adopted to directly retrieve the context information about the UE from the core network device, and the first response message comprises the context information about the UE,
   wherein subsequent to receiving the first request message from the serving network side device for the UE in the inactive state, the service request processing method further comprises:
   when the context information about the UE has been retrieved unsuccessfully, establishing the connection from the serving network side device of the UE to the user plane and the control plane of the core network for the serving network side device; and
   wherein subsequent to establishing the connection from the serving network side device of the UE to the user plane and the control plane of the core network for the serving network side device, the service request processing method further comprises:
   determining whether the connection from the radio access network side of the UE to the user plane and the control plane of the core network is repeated; and
   when the connection from the radio access network side of the UE to the user plane and the control plane of the core network is repeated, notifying an original anchor network side device for the UE to release the context information about the UE.

2. The service request processing method according to claim 1, wherein subsequent to receiving the first request message from the serving network side device for the UE in the inactive state and prior to transmitting the first response message to the serving network side device, the service request processing method further comprises:
   transmitting a second request message to an anchor network side device for the UE; and
   receiving a second response message from the anchor network side device,
   wherein the second request message is adopted to retrieve the context information about the UE, the second response message comprises the context information about the UE and an identifier of the context information about the UE, and the anchor network side device for the UE is configured to store therein the context information about the UE and maintain a connection from a network side of the UE to a control plane and a user plane of a core network.

3. The service request processing method according to claim 1, wherein the first response message further comprises at least one of: (i) an identifier of the serving network side device, (ii) the identifier of the context information about the UE, and (iii) an identifier of the anchor network side device for the UE.

4. The service request processing method according to claim 1, wherein the first request message comprises the identifier of the anchor network side device and/or the identifier of the context information about the UE, and the second request message comprises the identifier of the context information about the UE,
   wherein the identifier of the anchor network side device is adopted by the core network device to retrieve the context information about the UE from the anchor network side device, and the identifier of the context information about the UE is adopted by the anchor network side device to search for the context information about the UE and transmit the context information about the UE to the core network device.

5. The service request processing method according to claim 1, wherein subsequent to transmitting the first response message to the serving network side device, the service request processing method further comprises:
   switching a path for the UE to a connection from the serving network side device to the user plane and the control plane of the core network,
   wherein the path for the UE comprises the connection from the radio access network side of the UE to the user plane and the control plane of the core network.

6. The service request processing method according to claim 5, wherein subsequent to switching the path for the UE to the connection from the serving network side device to the user plane and the control plane of the core network, the service request processing method further comprises:
   notifying the anchor network side device for the UE to release the context information about the UE.

7. A core network device, comprising a processor, a memory, and a computer program stored in the memory and executed by the processor, wherein the computer program is executed by the processor so as to implement the service request processing method according to claim 1.

* * * * *